(12) United States Patent
Miller et al.

(10) Patent No.: US 9,762,056 B1
(45) Date of Patent: *Sep. 12, 2017

(54) ELECTRICAL OUTLET UNIT

(71) Applicants: Dennis L. Miller, Davenport, IA (US);
Dwain C. May, Bettendorf, IA (US)

(72) Inventors: Dennis L. Miller, Davenport, IA (US);
Dwain C. May, Bettendorf, IA (US)

(*) Notice: Subject to any disclaimer, the term of this patent is extended or adjusted under 35 U.S.C. 154(b) by 618 days.

This patent is subject to a terminal disclaimer.

(21) Appl. No.: 14/217,061

(22) Filed: Mar. 17, 2014

Related U.S. Application Data

(63) Continuation-in-part of application No. 13/043,455, filed on Mar. 8, 2011, now Pat. No. 8,963,731, and a continuation-in-part of application No. 12/768,724, filed on Apr. 27, 2010, now Pat. No. 8,471,718, application No. 14/217,061, which is a continuation-in-part of application No. 13/903,747, filed on May 28, 2013, now Pat. No. 9,048,040, which is a continuation of application No. 12/768,724.

(60) Provisional application No. 61/798,338, filed on Mar. 15, 2013, provisional application No. 61/798,776, filed on Mar. 15, 2013, provisional application No. 61/317,722, filed on Mar. 26, 2010, provisional application No. 61/173,001, filed on Apr. 27, 2009, provisional application No. 61/311,721, filed on Mar. 8, 2010.

(51) Int. Cl.
| | |
|---|---|
| *G08B 21/00* | (2006.01) |
| *H02J 3/00* | (2006.01) |
| *H01R 13/66* | (2006.01) |

(52) U.S. Cl.
CPC ............ *H02J 3/00* (2013.01); *H01R 13/6666* (2013.01); *Y10T 307/951* (2015.04)

(58) Field of Classification Search
CPC H01R 17/6666; H01R 25/003; H01R 25/006; H01R 13/6666; Y10T 307/951; Y10T 307/461; Y10T 307/865; H02J 3/00
USPC ......... 340/654, 656; 307/131; 361/115, 118; 363/146; 439/490
See application file for complete search history.

(56) References Cited

U.S. PATENT DOCUMENTS

| | | |
|---|---|---|
| 4,668,878 A | 5/1987 | Wyss |
| 5,430,598 A | 7/1995 | Rodolfo et al. |
| 5,742,466 A | 4/1998 | Kram |
| 6,476,523 B1 | 11/2002 | Lee |
| 7,651,365 B2 | 1/2010 | Chien |
| 7,977,825 B2 | 7/2011 | Gilbert |
| 8,471,718 B1 | 6/2013 | Miller et al. |

(Continued)

*Primary Examiner* — John A Tweel, Jr.
(74) *Attorney, Agent, or Firm* — Hamilton IP Law, PC; Jay R. Hamilton; Charles Damschen

(57) ABSTRACT

An electrical unit outlet device is disclosed for controlling power isolation, based on a pre-determined time, for a device charger, while remaining plugged into a power outlet. A power isolating circuit cuts any power to the charging device off when charge is complete. Multiple embodiments are disclosed including a ground fault interrupted electrical unit outlet that may be controlled by a timer to shut down after batteries have been charged is disclosed and claimed herein. All circuits will subject to ground fault interruption protection and may be subject to surge protection as well. In another embodiment, a lamp with timed charging outlets that shut down when batteries are being charged is disclosed and claimed herein.

17 Claims, 28 Drawing Sheets

(56) References Cited

U.S. PATENT DOCUMENTS

| | | | | |
|---|---|---|---|---|
| 8,963,731 B1* | 2/2015 | Miller | .................... | G04C 23/04 307/131 |
| 2004/0218411 A1 | 11/2004 | Luu et al. | | |

* cited by examiner

ELECTRICAL OUTLET UNIT

CROSS REFERENCE TO RELATED APPLICATIONS

Applicant claims priority and benefit from provisional U.S. Pat. App. Nos. 61/798,338 and 61/798,776 both filed on Mar. 15, 2013 under 35 U.S.C. 119. The present application is also a continuation-in-part of and claims priority from U.S. patent application Ser. No. 13/903,747 filed on May 28, 2013, which was a continuation of U.S. patent application Ser. No. 12/768,724 filed on Apr. 27, 2010, now U.S. Pat. No. 8,471,718 which claimed priority from provisional U.S. Pat. App. No. 61/173,001 filed on Apr. 27, 2009. The present application is also a continuation-in-part of and claims priority from U.S. patent application Ser. No. 13/043,455, which claimed priority from provisional U.S. Pat. App. Nos. 61/311,721 filed on Mar. 8, 2010 and 61/317,722 filed on Mar. 26, 2010, all of the preceding applications are incorporated by reference herein in their entireties.

FIELD OF INVENTION

The invention is generally directed to an apparatus for making electrical devices more efficient. More specifically, certain embodiments increase the efficiency of battery chargers by automatically removing the electrical power to the charger once charging is complete.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

The desired use of rechargeable battery operated devices has created an increasing demand of cordless electronic devices including but not limited to cell phones, PDAs, laptop computers, MP3 players, digital cameras, portable GPS units, cordless personal hygiene products, and cordless hand or yard tools. Often the corresponding chargers remain plugged into a power outlet and consume power when the devices are not being used. This consumed energy has required power plants to accommodate the futile power continuously consumed by the plugged in charger, thus increasing nonrenewable carbon based resources such as coal, oil and natural gas.

The electrical outlet unit may be designed to isolate the charger from the electrical power source when the device battery has reached a maximum charge. When electrical isolation from a battery occurs, the charging device consumes no power. With power consumption cut off, no unnecessary power and nonrenewable resources are wasted. Further, certain embodiments of the electrical outlet unit allow the user to select the amount of time the battery is to be charged. Further yet, certain embodiments of the electrical outlet unit maintain a full charge on the connected devices by intermittently reconnecting the power.

In previous versions of electrical outlet units, in order to reduce the electrical load from the battery chargers, a set time was used for charging a battery. Once this time had elapsed, the device would automatically isolate the charger from the electrical power source. Once the power source was electrically isolated from the battery charger, no power was consumed by the charging device.

Once the device had completed a charging cycle, the device would remain disconnected until the initiation switch was pressed again to start a new cycle. After charging, a battery slowly loses its charge even when not in use. Left unattended for long enough, the charge loss would be sufficient to render the battery unusable until such time it was recharged. The prior art energy saving devices do not allow a user to adjust the charging time, or provide battery maintenance, to match the battery thereby maximizing the energy savings.

SUMMARY OF THE INVENTION

Unlike prior art devices, the present electrical outlet unit allows the user to specify the period of time that the electrical outlet unit provides power to the battery charger. One version of the present electrical outlet unit allows the user to select a charge maintaining state, in which the device provides power to the charger for 20 minutes out of every 72 hours. In another version, the electrical outlet unit may be integrated into an appliance, such as lamp, providing docking bay for charging devices and controlling the duration of the charging. In another version, the electrical outlet unit may have a ground fault interrupter circuit integrated allowing control of the duration of charging for outlets required by code to have this type of protection in place.

In one embodiment of the electrical outlet unit, an electromechanical device called a relay is used to turn the charger on and off. The relay has a set of electrical contacts that when closed allow electrical power to be supplied to the battery charger. When the electrical contacts are open they isolate the electrical power source from the battery charger. An additional circuit, called the command circuit, may control whether the relay's electrical contacts are open or closed. The command circuit may be comprised of an initiation switch, a processor, surge suppressors, status indicators, and a relay output driver.

All of these components may be mounted inside a plastic enclosure, which is referred to herein as the housing. The housing may be designed such that it will plug into any standard grounded 110-125 Volt A.C. outlet. The housing also may have from 1 to 6 receptacles that allow devices to be plugged in. The housing also may have additional openings for the initiation switch and for the status indicators to protrude through the case.

Once the housing has been plugged into a functioning outlet, electricity is sent to the command circuit. The command circuit may then illuminate a status-indicator LED to indicate the surge protection circuit is functioning properly. The surge suppression circuit will protect against voltage surges, regardless if a charge cycle is underway or not, while the device is plugged in and receiving power. If this LED does not illuminate, it indicates a fault condition and the device should be discarded. With the device plugged in and functioning properly, from 1 to 6 battery chargers then may be plugged into the receptacles on the device. Then, if at least one of the battery chargers has been connected to its associated device, the initiation switch would be used to start a charging cycle.

In one embodiment the charging cycle is initiated by pressing the start push-button repeatedly until the desired charging time is shown on the display. The charging times are shown on the display in decimal format, i.e., 3.5 equals three and one-half hours. Once the desired charging time has been selected an electrical signal is sent to turn on the relay output circuit. This closes the electrical contacts on the relay, sending electrical power to the battery charger(s) connected to the device. Additionally, the selected charge time is loaded into a digital timer inside the processor. Once loaded this digital timer starts counting down. As the time is counted down the display may be configured to continually update how much time is left on the current charge cycle. When the digital timer reaches zero the display may show "- -" indicating the charge cycle is complete and the relay output driver is turned off. When the relay driver turns off, the relay contacts open, turning off all battery chargers connected to the device, thereby completing the charging cycle.

Another goal of the present electrical outlet unit is aimed to provide battery maintenance to eliminate battery power discharge. In the present electrical outlet unit, when the relay driver turns off, the relay contacts open, turning off all battery chargers connected to the device, thereby completing the charging cycle. At completion of the charging cycle the battery maintenance component of the device may be configured to enter maintenance mode. While in maintenance mode the device will continually repeat maintenance cycles.

A maintenance cycle may be made up of a pause time and an abbreviated charge time. Each time a maintenance cycle is started, the digital timer starts counting down the pause time. In the current device the pause time is set to 72 hours, but this is by no means limiting. The status indicator flashes while the pause time is counted down. When the pause time reaches zero, the relay output driver is turned on causing the relay contacts to close. While the relay contacts are closed power is once again sent to the battery charger(s). The digital timer now starts counting down the abbreviated charging time. The status indicator may be turned on while the abbreviated charging time is being counted. In the current device the abbreviated charging time is 20 minutes, but this period is not limiting and may be set to any value optimal for the specific application of the present electrical outlet unit. When the abbreviated charge time reaches zero the output relay driver is turned off causing the relay contacts to open. When the relay contacts open the battery charger(s) are disconnected thus completing a maintenance cycle.

Pressing the initiation switch during either the initial charge cycle or while in maintenance mode will cause the unit to turn off. When the device is turned off, the relay and the status indicator may be turned off, thereby turning off any devices plugged into the switched outlets.

Since the device fills a standard outlet, it may be necessary at times to temporarily plug in a device that requires constant power. To accommodate this need a special HOLD mode or ALWAYS ON receptacle may be added to the device.

In one illustrative embodiment, not shown, Applicant would build a 4 outlet unit similar to that disclosed as FIG. 1 built for installation use as "built-in" integrated unit. Two (2) of the outlets would always be "on" or "hot". The other two (2) outlets would be configured so that they would be electrically connected to a timer control system to limit the electrical power consumption of electrically connectable devices having rechargeable batteries by automatically removing the electrical power to the outlet unit is protected electrical outlet unit once charging is complete. In another embodiment, all circuits would also be connected to electrical components providing for surge protection.

In another embodiment of the electrical outlet unit, ground fault interrupter (GFI) technology and circuitry would be incorporated into various configurations, including integration into sockets built into walls, integration into wall units for use with any power outlet as well as power strips and surge protectors. The GFI enabled embodiments of the electrical outlet unit could be used with any of the combinations of surge suppression, timer controlled charging and battery maintenance systems and configurations as disclosed and claimed herein, without limitation or restriction herein.

In another embodiment of the electrical outlet unit, the various timer, surge suppression and battery maintenance configurations could be integrated into the base of appliances, such as a lamp, television or multi-media stand and control center to form a docking bay embodiment that would support various configuration of timer controlled outlets and non-timer controlled outlets as well as USB and or types of ports or outlets useful for charging rechargeable devices including without limitation or restriction personal computers, telephones, MP3 players, etc.

It is an object of the present electrical outlet unit to provide an apparatus for isolating power in a cordless device's charger while plugged into a power outlet.

It is another object of the present electrical outlet unit to provide an apparatus that will eliminate the waste of power and nonrenewable resources, through power isolation within the device and device charger's circuit.

It is another object of the present electrical outlet unit to allow the user to select the amount of time the battery is to be charged.

It is another object of the present electrical outlet unit to provide a battery maintenance component to keep a battery at full charge while intermittently connecting and disconnecting the charging device.

It is another object of the present electrical outlet unit to incorporate ground fault interrupter (GFI) circuitry to allow the user to install or use an embodiment of the electrical outlet unit disclosed herein in a bathroom or outside near a pool and meet applicable regulations and codes requiring GFI outlets in certain locations and for certain conditions, typically when users are proximate water and electricity to avoid unintended electrocution.

It is another object of the present electrical outlet unit for incorporation into appliances, such as lamps, to create a docking bay allowing a user to select the amount of time a connected device having a rechargeable battery is to be charged. As described, the docking bay may have multiple outlets for operating and allowing charging of connected rechargeable devices.

These and other objects of the present electrical outlet unit will become apparent to those skilled in the art in light of the following drawings, descriptions, and claims.

DETAILED DESCRIPTION—BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

Figure 9:
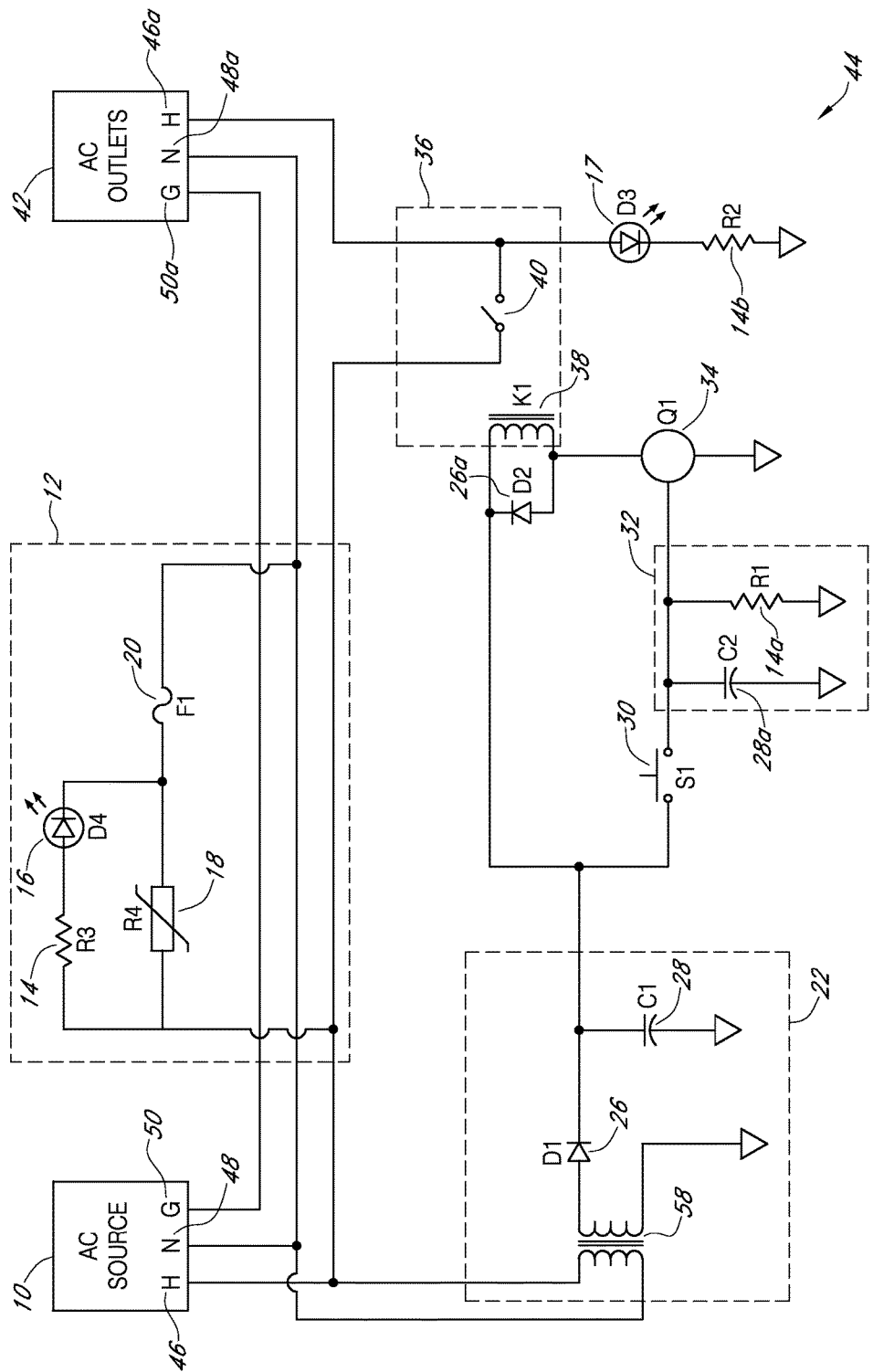

FIG. 9 provides a diagram of a first illustrative embodiment of the power isolation circuitry of a timer unit of an illustrative embodiment of an electrical outlet unit.

Figure 10:
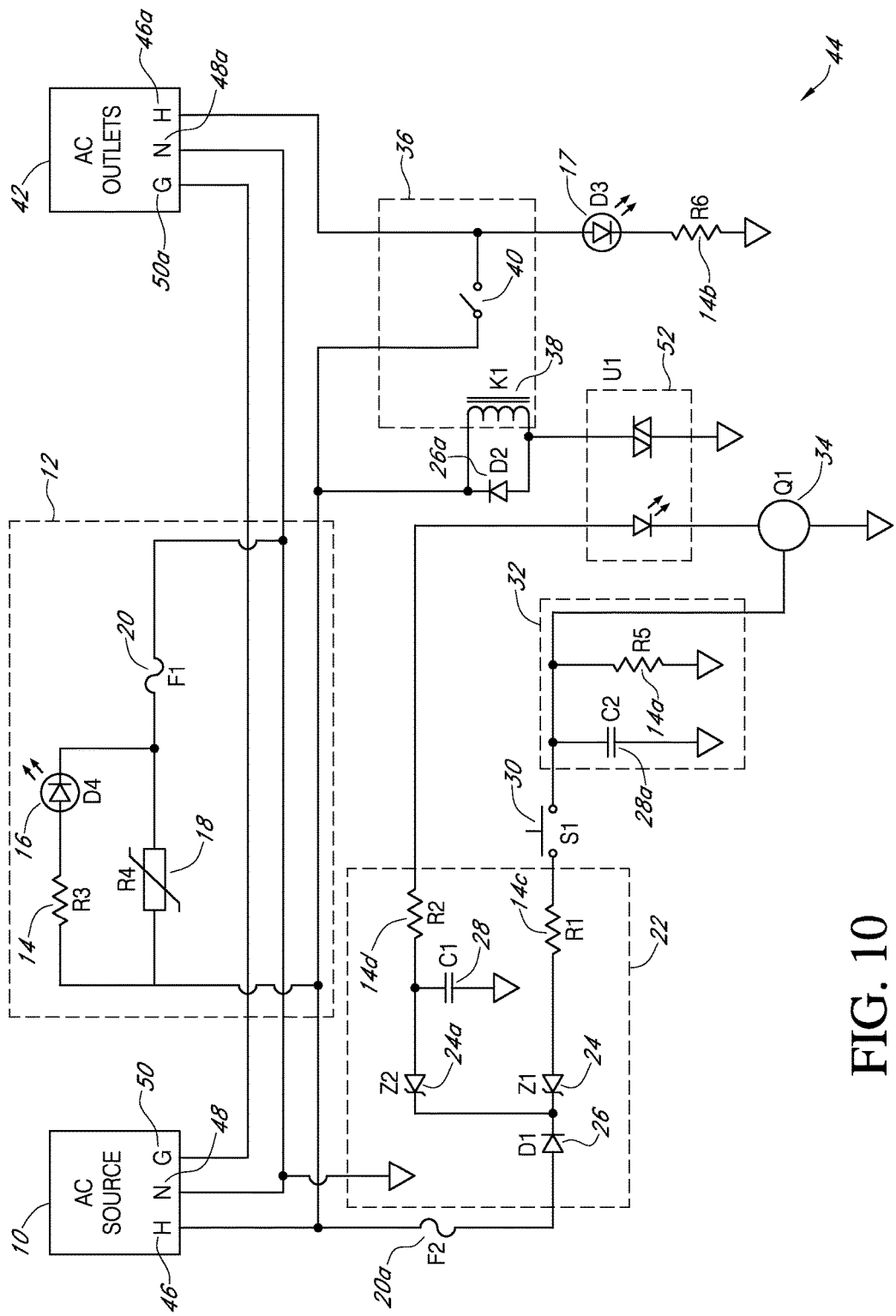

FIG. 10 provides a diagram of a second illustrative embodiment of the power isolation circuitry of a timer unit of an illustrative embodiment of an electrical outlet unit.

Figure 11A:
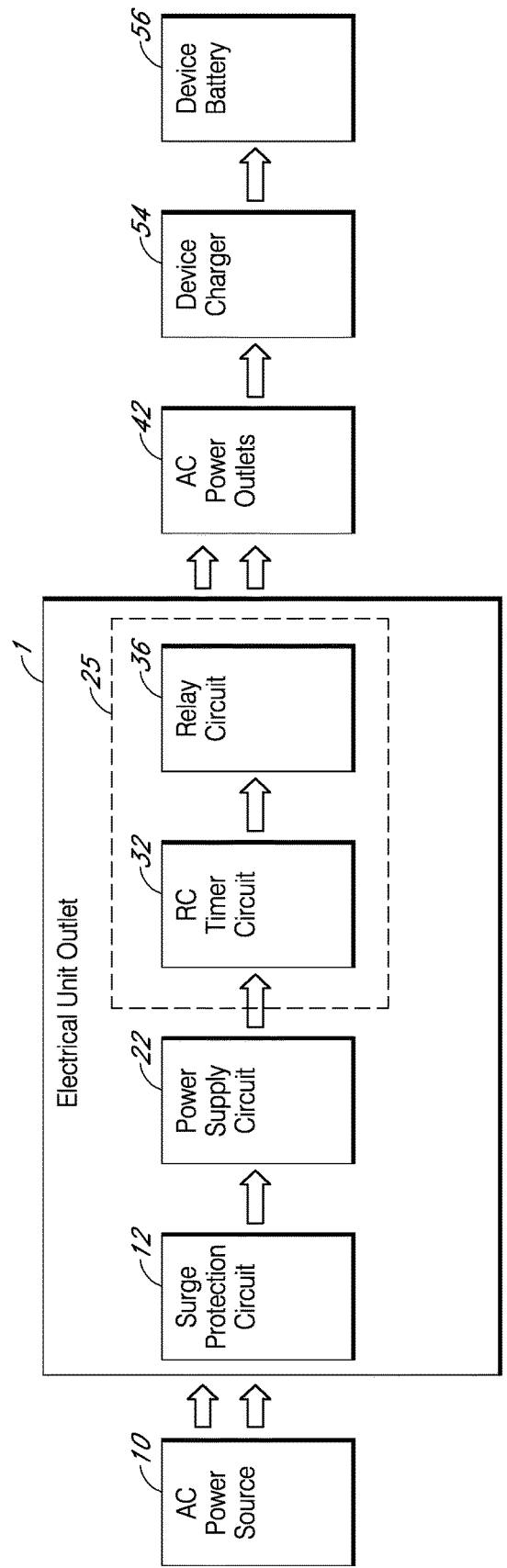

FIG. 11A provides a simplified flow diagram of an illustrative electrical outlet unit having the circuitry of FIG. 9 connected to a device having a rechargeable battery during charging.

Figure 11B:
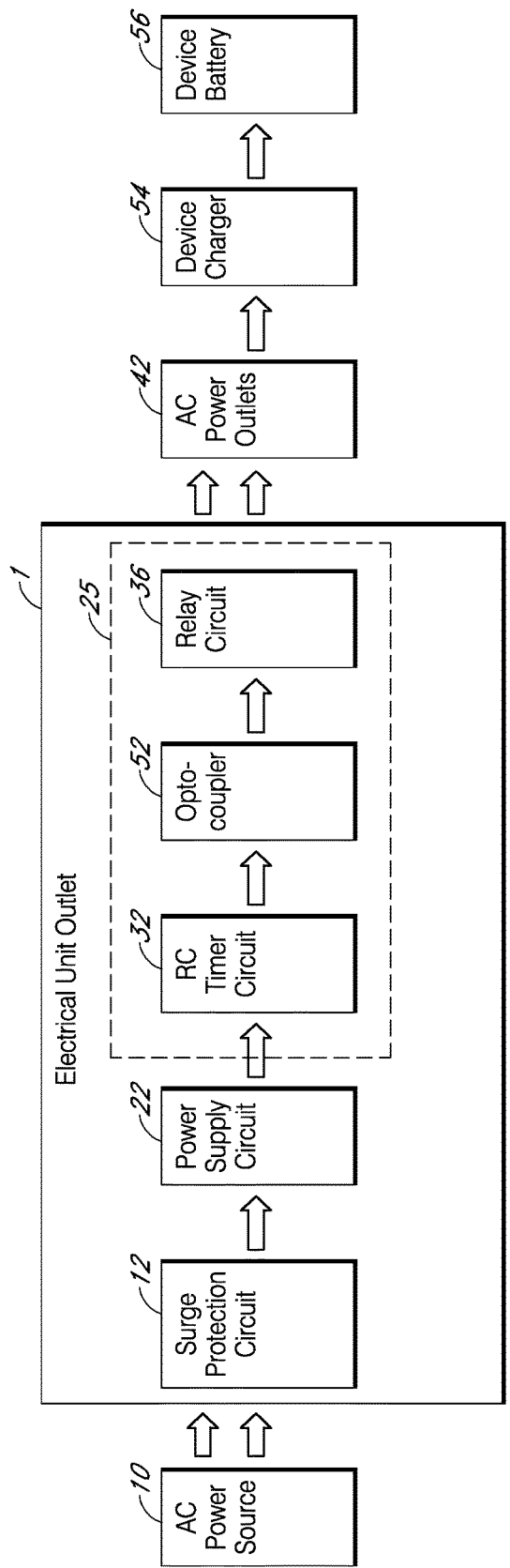

FIG. 11B provides a simplified flow diagram of an illustrative electrical outlet unit having the circuitry of FIG. 10 connected to a device having a rechargeable battery during charging.

Figure 12:
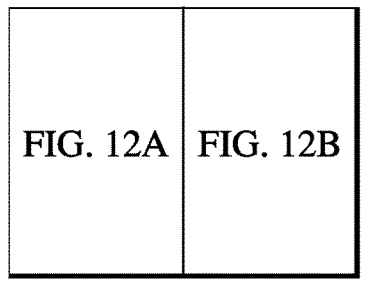
Figure 12A:
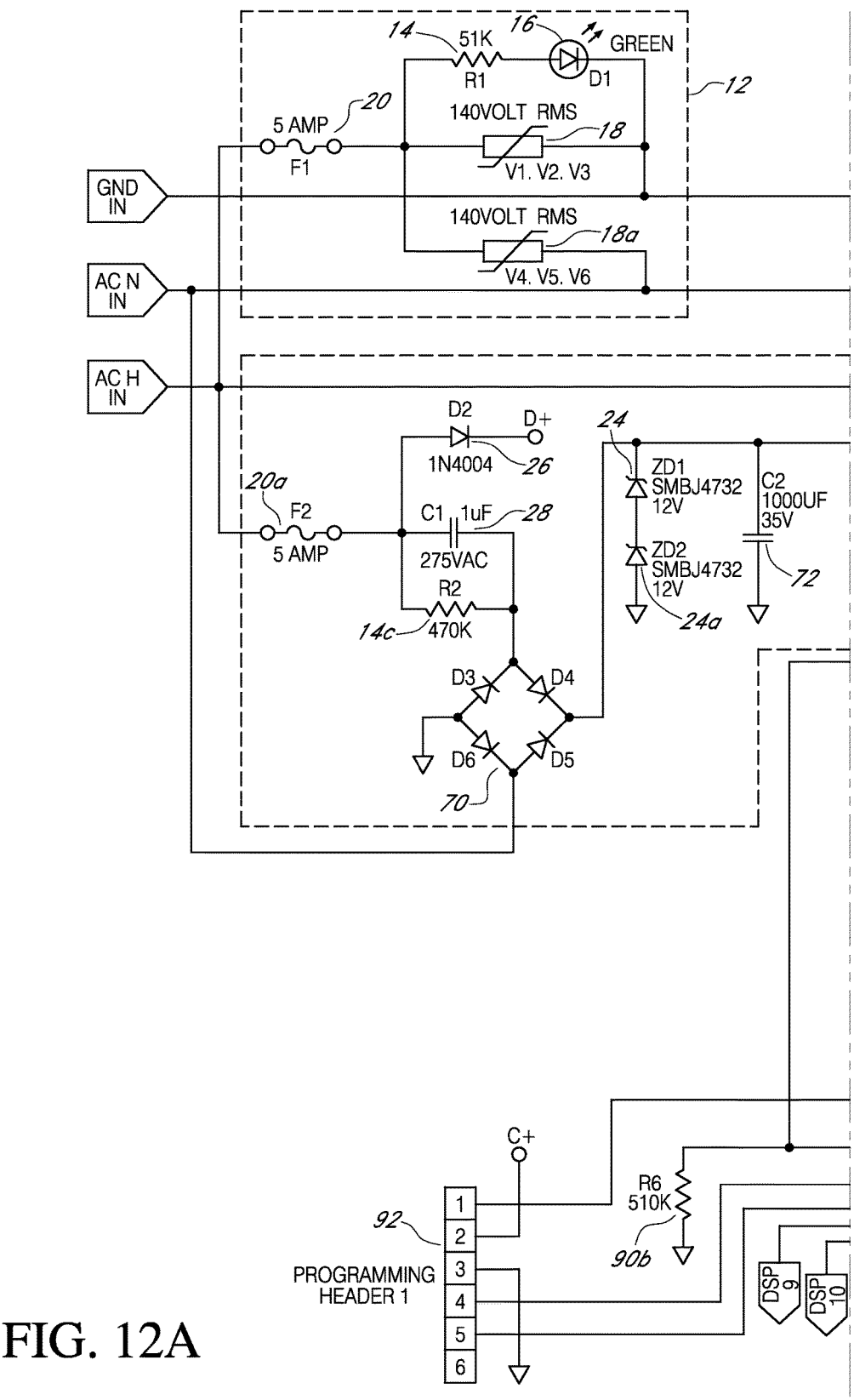

FIG. 12A provides a diagram of a first illustrative embodiment of the power isolation circuitry.

Figure 12B:
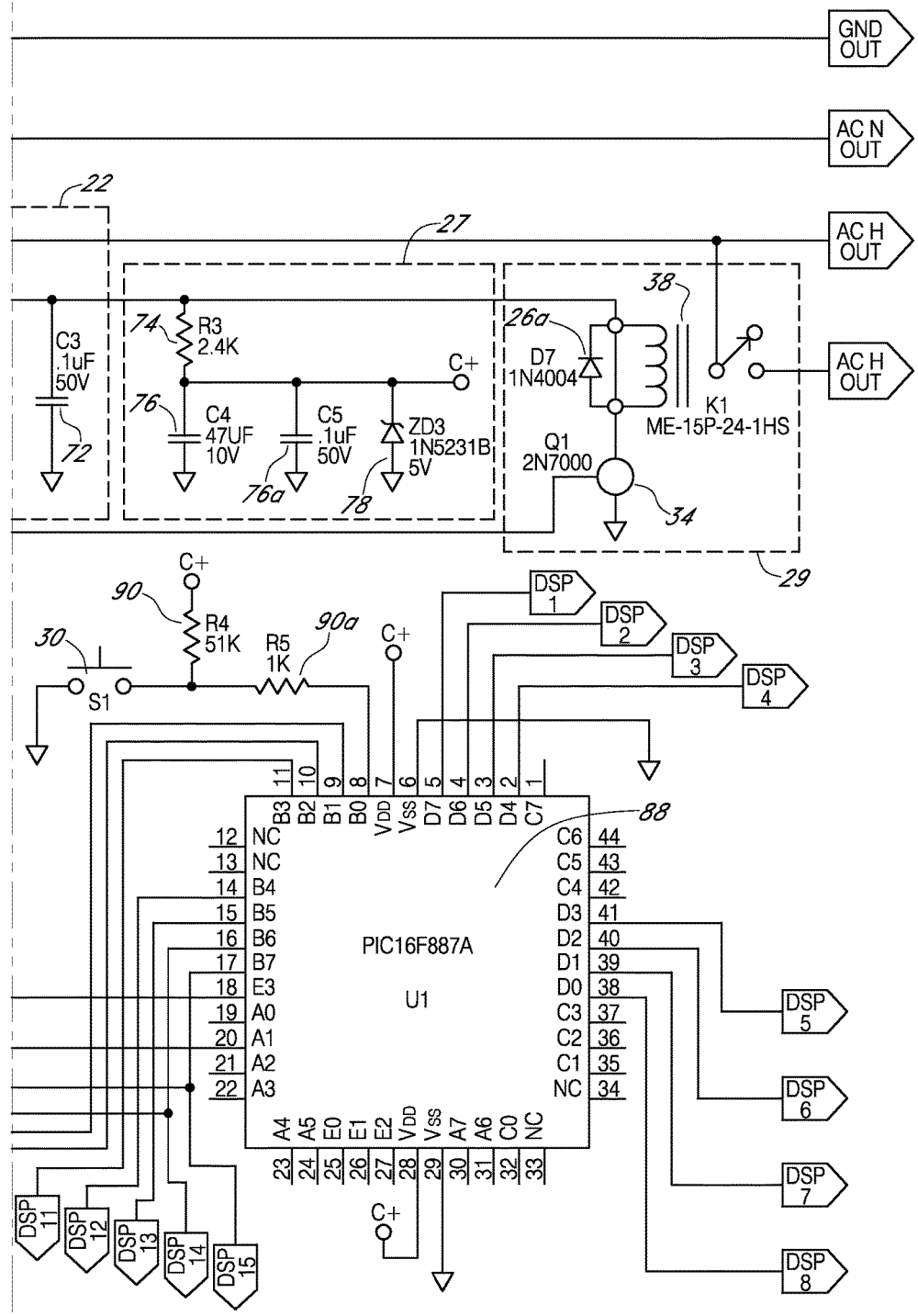

FIG. 12B provides a diagram of a first illustrative embodiment of the power isolation circuitry.

Figure 13:
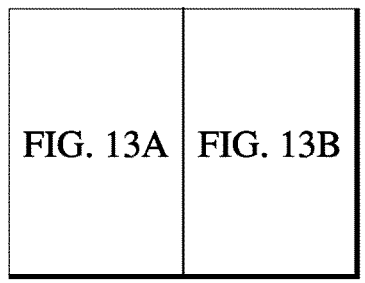
Figure 13A:
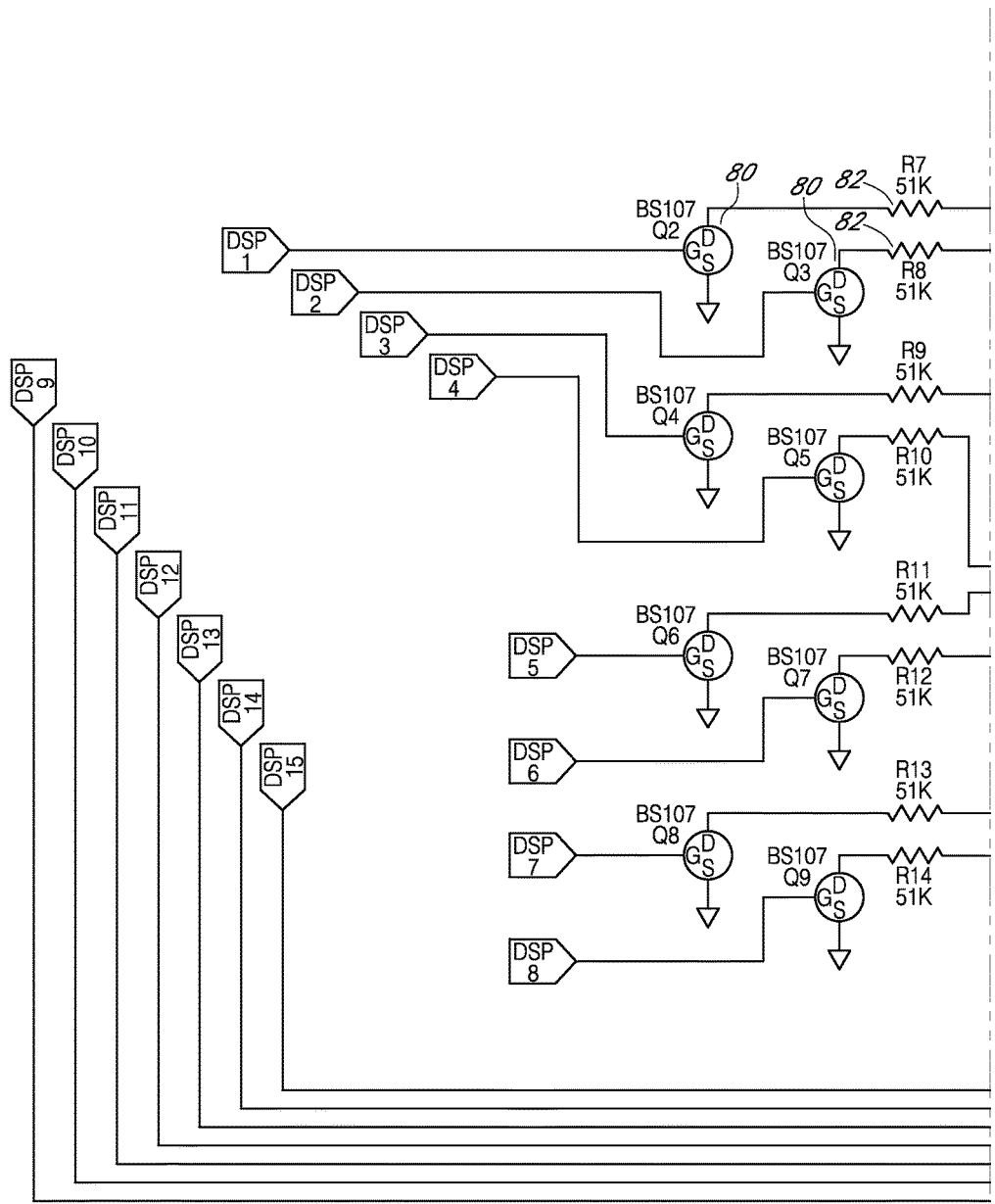

FIG. 13A provides a diagram of a second illustrative embodiment of the power isolation circuitry.

Figure 13B:
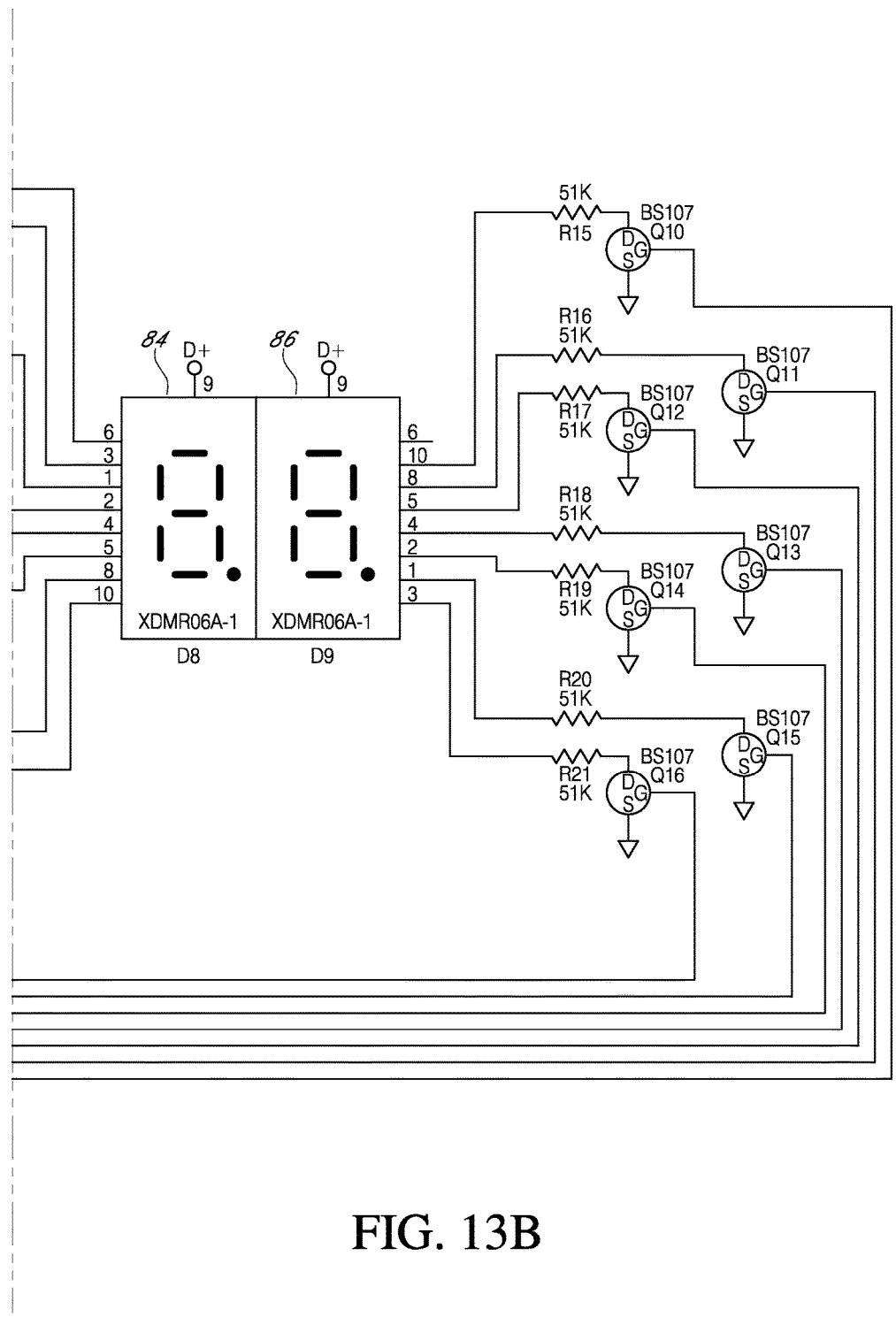

FIG. 13B provides a diagram of a second illustrative embodiment of the power isolation circuitry.

Figure 14:
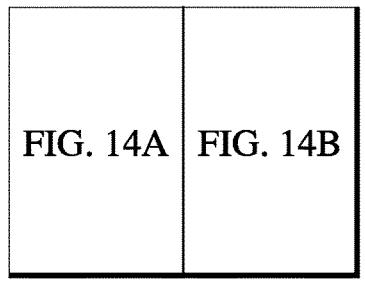
Figure 14A:
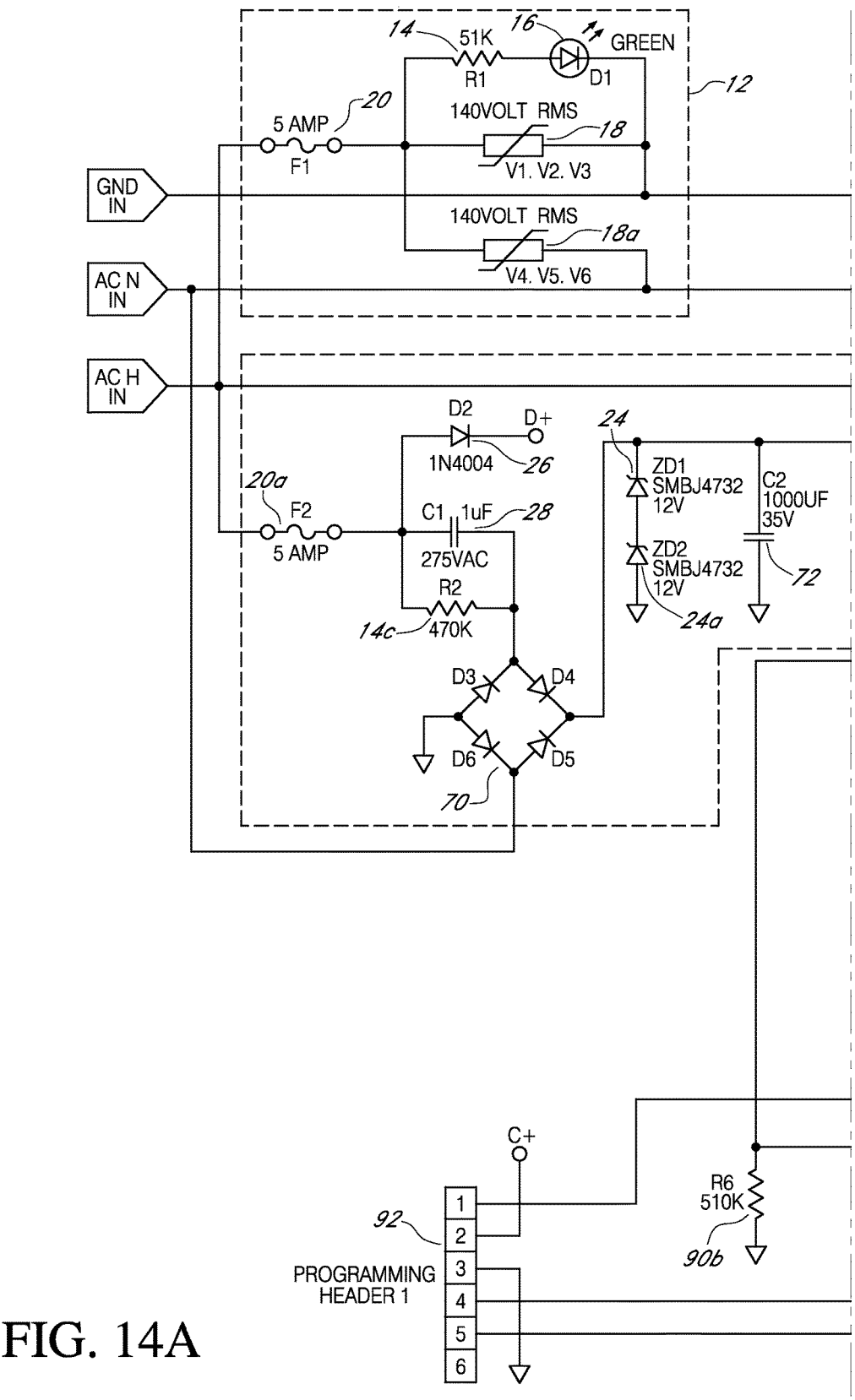

FIG. 14A provides a diagram of a third illustrative embodiment of the power isolation circuitry utilizing the battery maintenance feature.

Figure 14B:
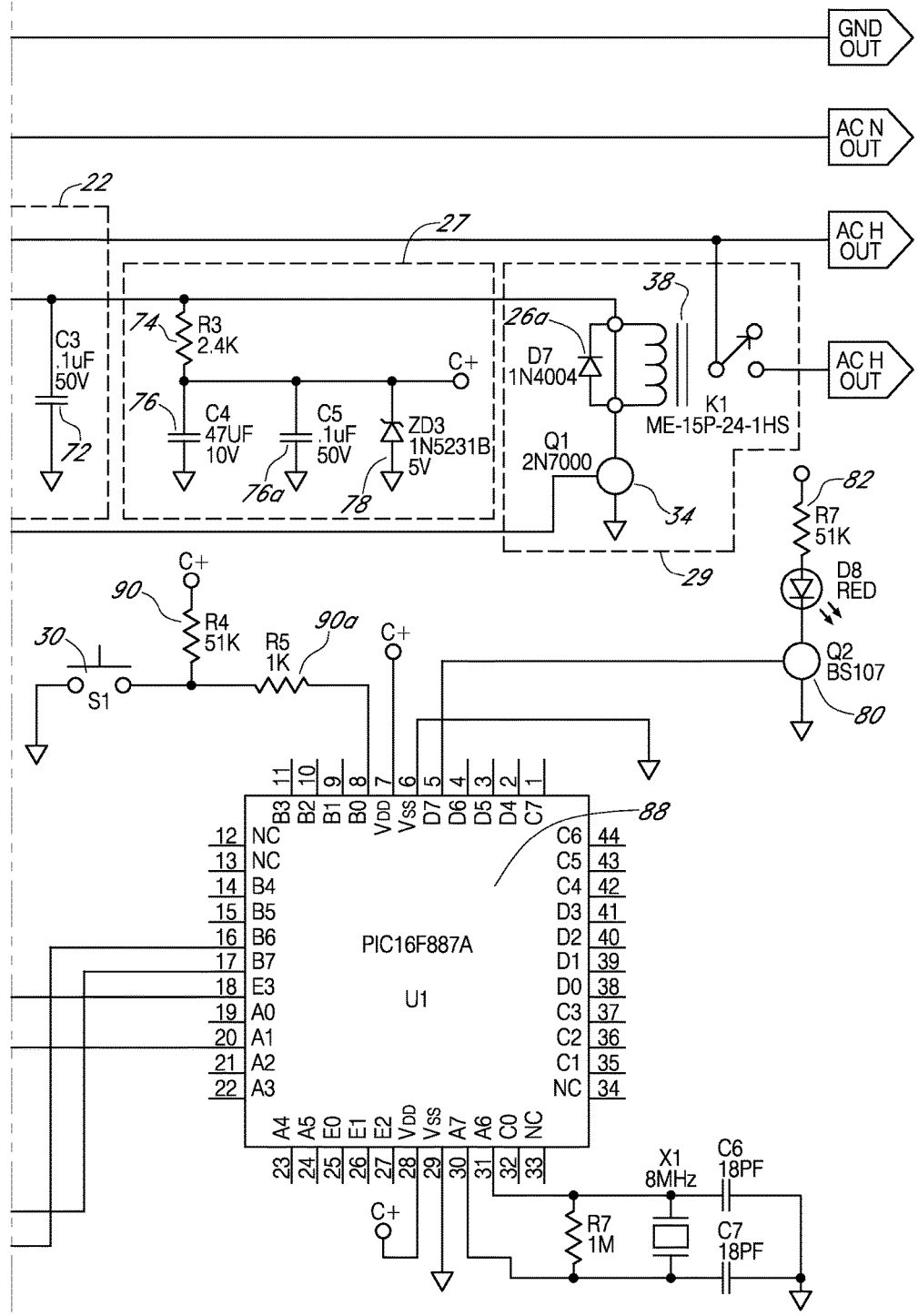

FIG. 14B provides a diagram of a third illustrative embodiment of the power isolation circuitry utilizing the battery maintenance feature.

Figure 15:
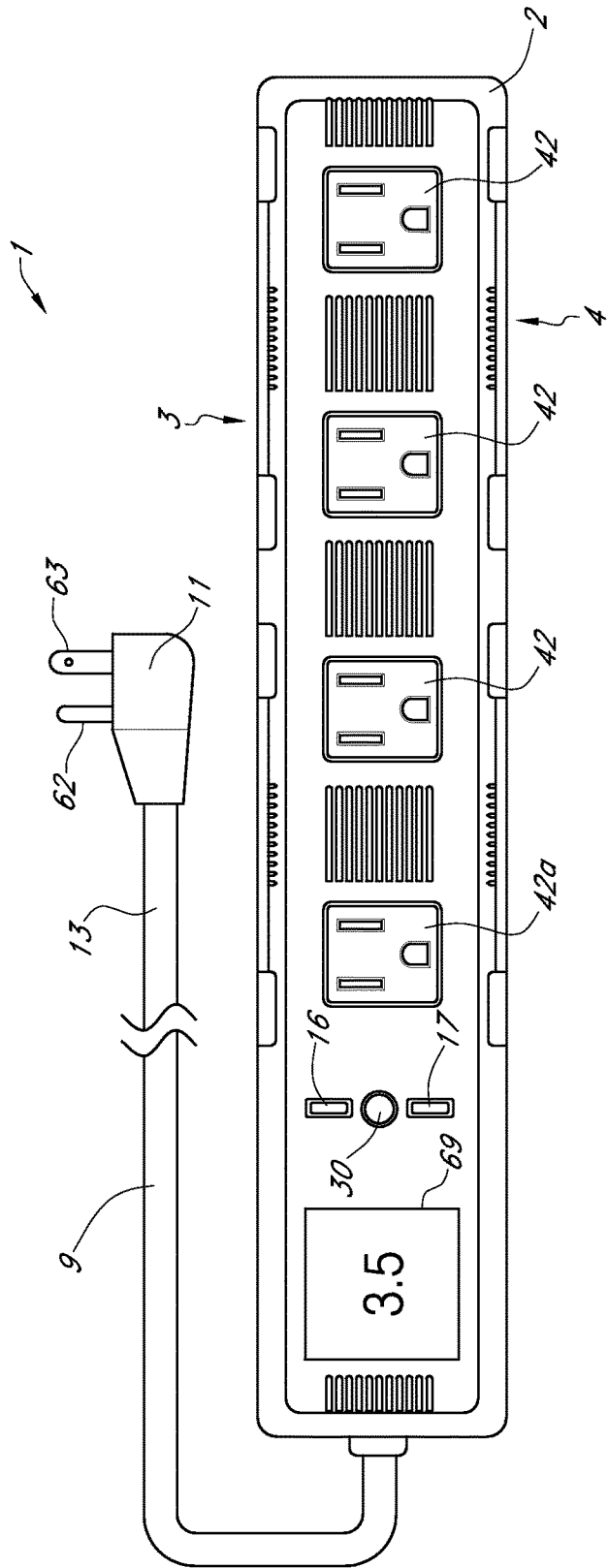

FIG. 15 is a perspective view of another embodiment of an electrical outlet unit subject of the present patent application incorporating the adjustable time component.

Figure 16:
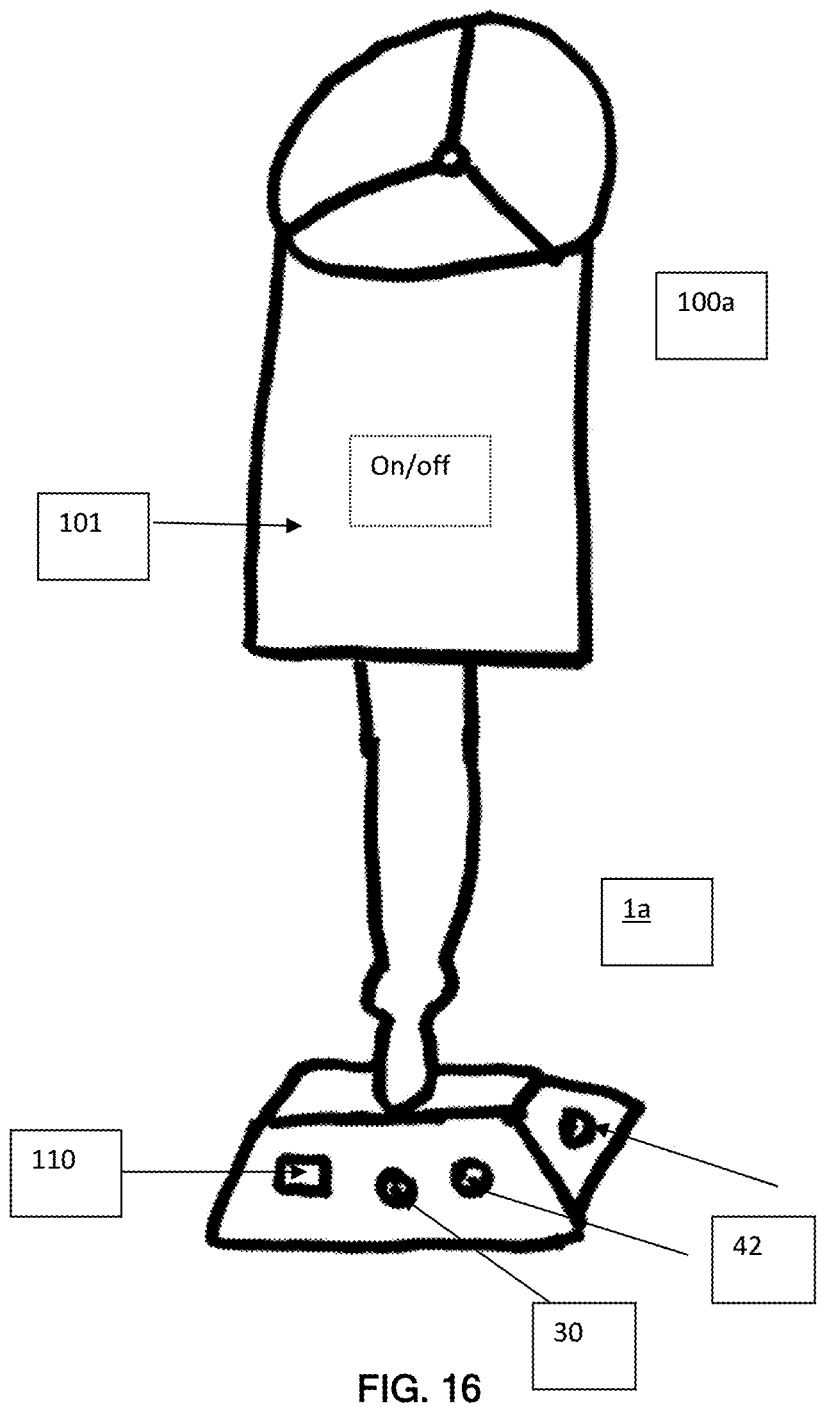

FIG. 16 is a perspective view of another embodiment of an electrical outlet unit configured as a docking bay integrated into an appliance, shown as a lamp.

Figure 17:
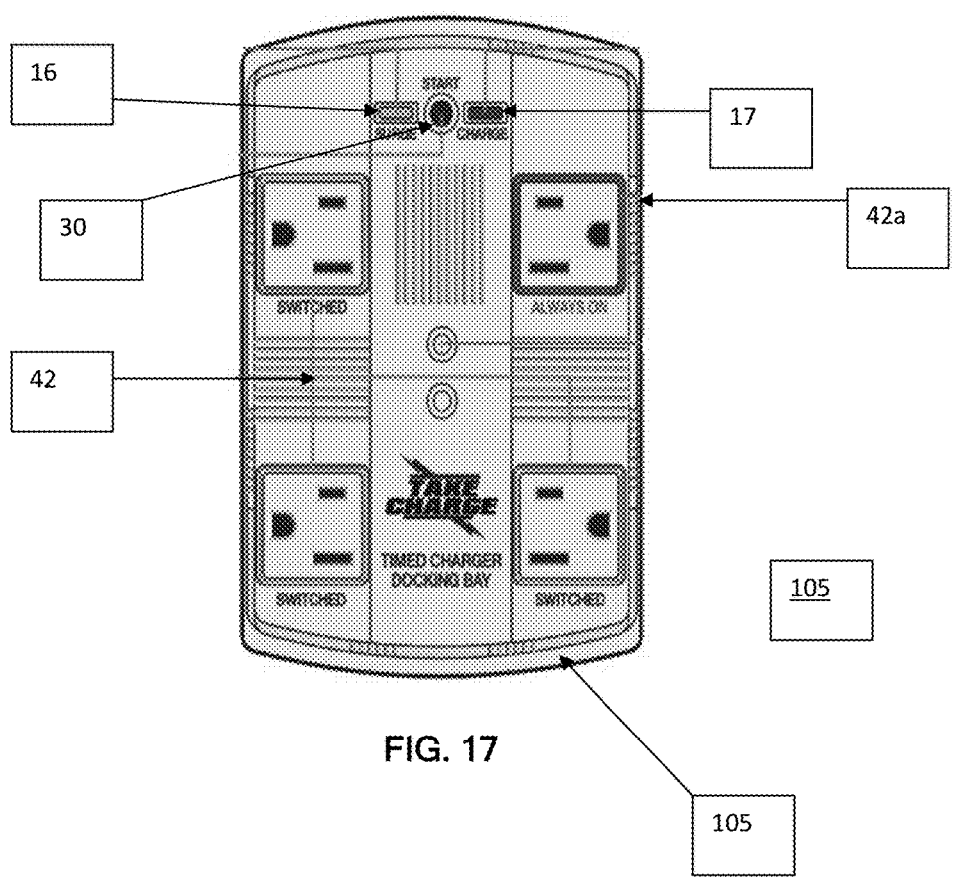

FIG. 17 is a front view of the control pad for the embodiment of the electrical outlet unit as shown in FIG. 16.

Figure 18A:
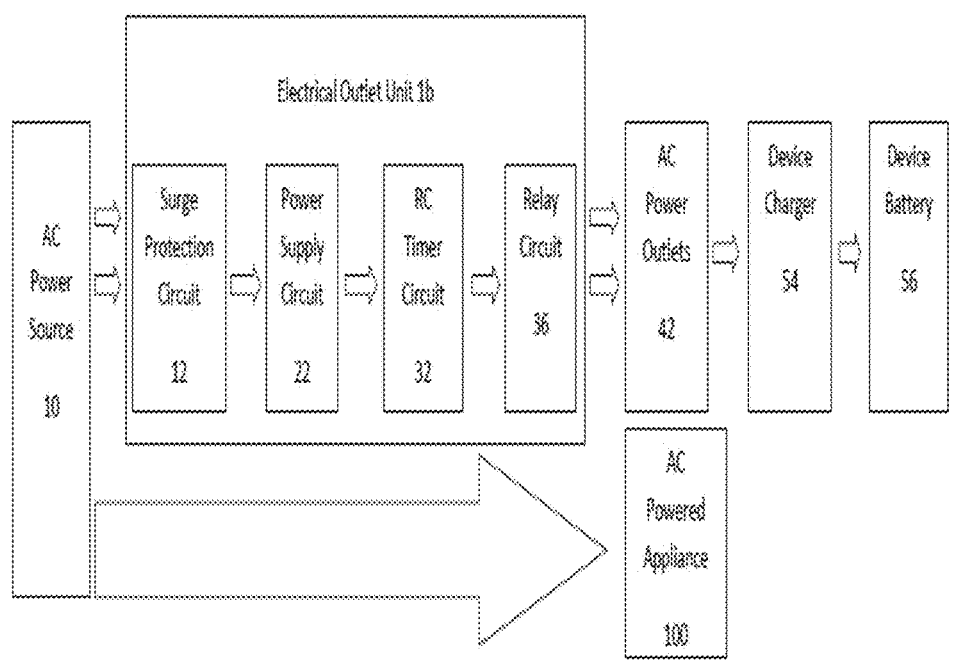

FIG. 18A provides a simplified flow diagram of an illustrative electrical outlet unit 1 configured as a docking bay 1b with the appliance operating independently of the timer of the docking bay 1b.

Figure 18B:
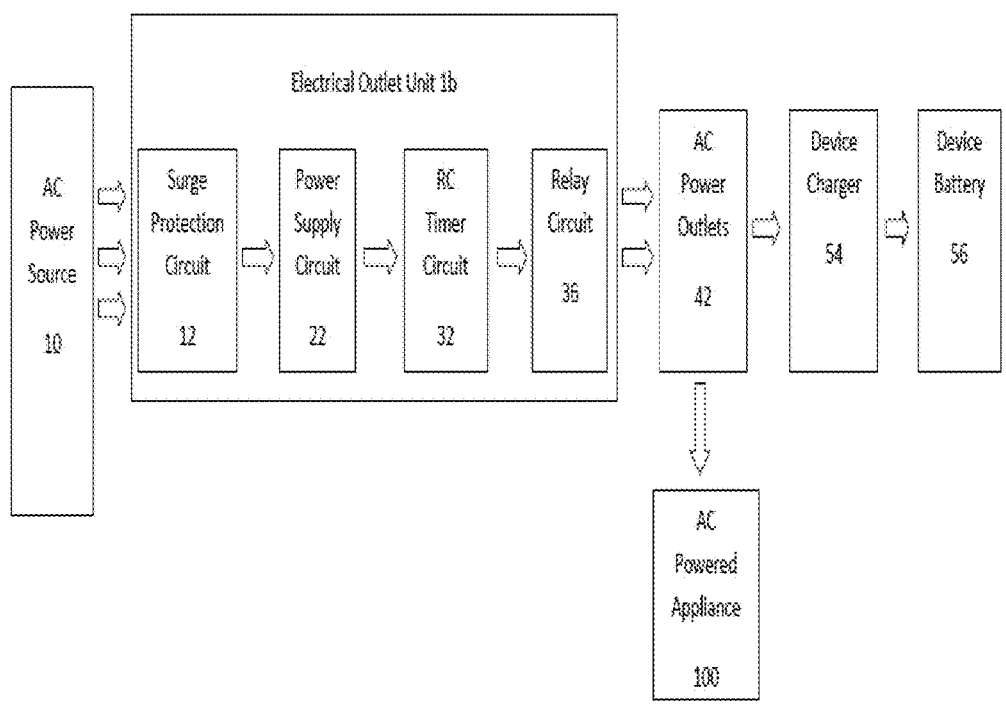

FIG. 18B provides a simplified flow diagram of an illustrative electrical outlet unit 1 configured as a docking bay 1b with timer control of the appliance.

Figure 19:
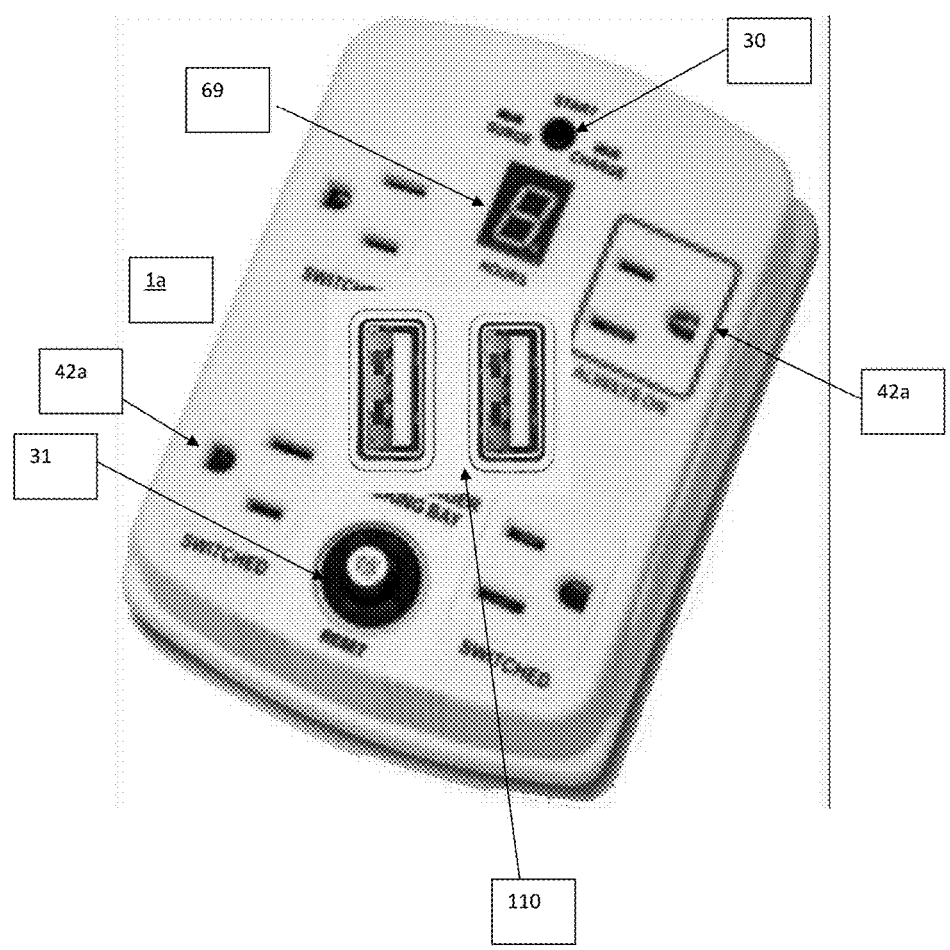

FIG. 19 is a front view of the docking bay control pad for another configuration of the embodiment of the electrical outlet unit.

Figure 20:
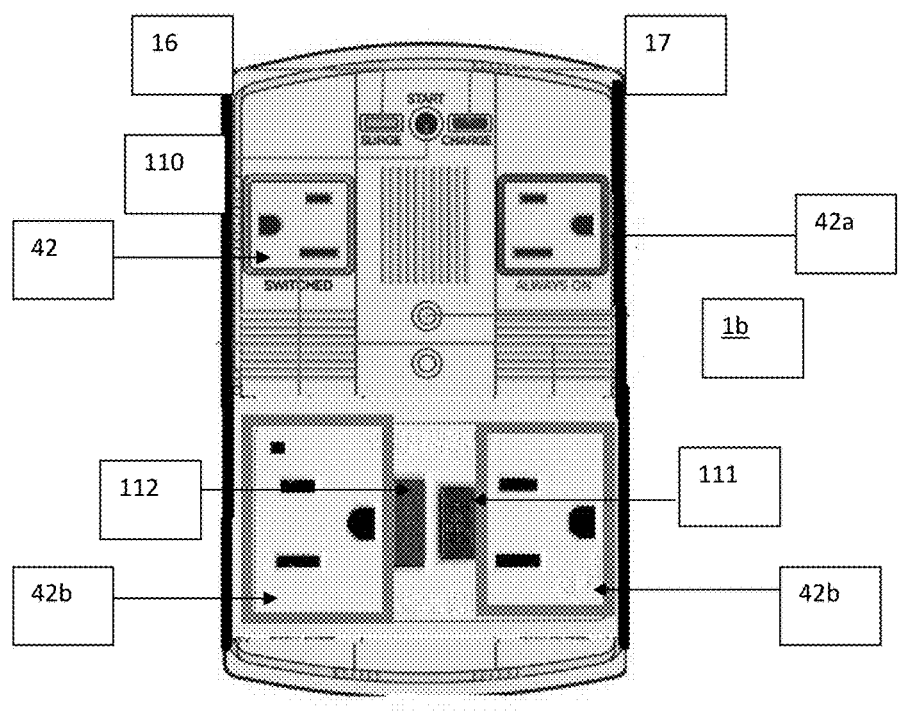

FIG. 20 is a front view of an embodiment of the electrical outlet unit configured with GFI circuitry.

Figure 21:
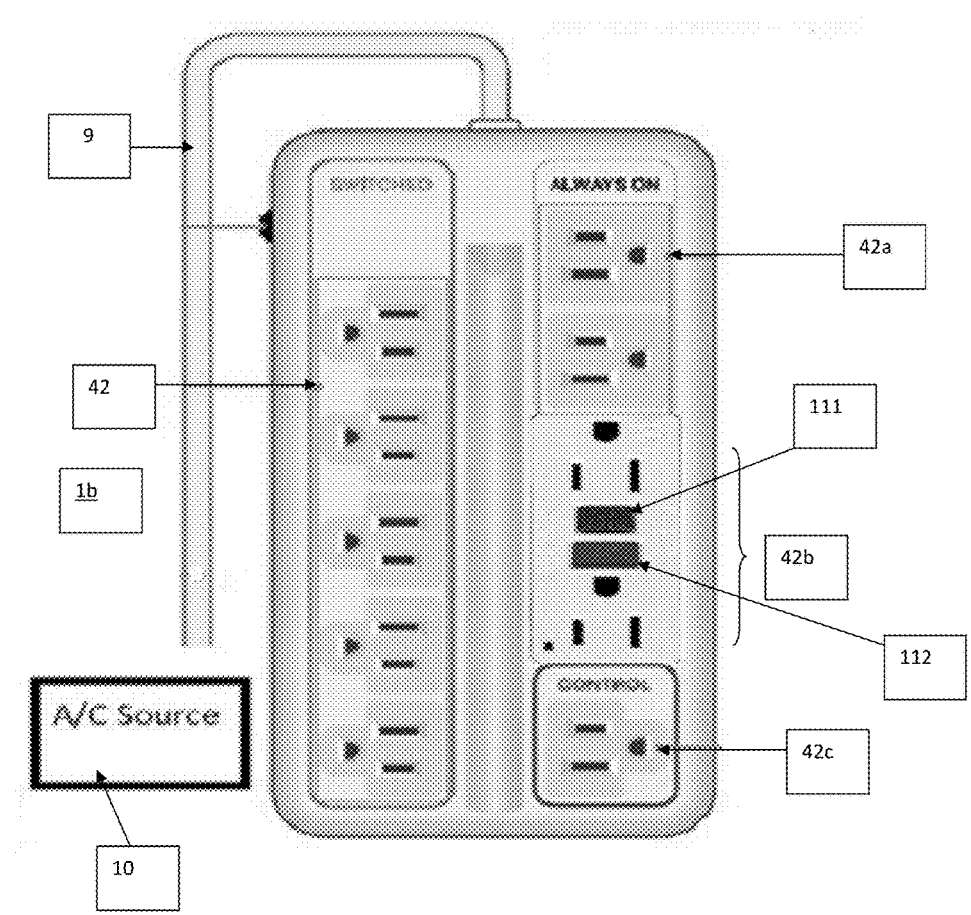

FIG. 21 is a front view of an embodiment of the electrical outlet unit configured with GFI circuitry.

| DETAILED DESCRIPTION - LISTING OF ELEMENTS | |
|---|---|
| Element Description | Element Number |
| Electrical Outlet Unit | 1 |
| Housing | 2 |
| First side - housing | 3 |
| Second side - housing | 4 |
| First end - housing | 5 |
| Second end-housing | 6 |
| Front | 7 |
| Rear | 8 |
| Power cord | 9 |
| AC power source | 10 |
| Connection | 11 |
| Surge protection circuit | 12 |
| Distal end | 13 |
| Surge protector resistor | 14 |
| RC timer resistor | 14a |
| Charging status resistor | 14b |
| First power supply resistor | 14c |
| Second power supply resistor | 14d |
| Blank | 15 |
| Surge protector LED (Light Emitting Diode) | 16 |
| Charging Status LED (Light Emitting Diode) | 17 |
| Varistor | 18 |
| Parallel Varistor | 18a |
| Surge protector fuse | 20 |
| Fuse | 20a |
| Power supply circuit | 22 |
| First power supply zener diode | 24 |
| Second power supply zener diode | 24a |
| Third power supply zener diode | 24b |
| Timer Unit | 25 |
| Power supply rectifying diode | 26 |
| Parallel relay snubbing diode | 26a |
| Low power supply circuit | 27 |
| Power supply capacitor | 28 |
| RC timer capacitor | 28a |
| Output Circuit | 29 |
| Initiation switch (push button) | 30 |
| RC timer circuit | 32 |
| Relay driver | 34 |
| Relay circuit | 36 |
| Relay coil | 38 |
| Relay contacts | 40 |
| Electrical receptacle (AC Outlets) | 42 |
| Power isolation circuit | 44 |
| AC source hot line | 46 |
| AC outlet hot line | 46a |
| AC source neutral line | 48 |
| AC outlet neutral line | 48a |
| AC source ground line | 50 |
| AC outlet ground line | 50a |
| Optocoupler | 52 |
| Device charger | 54 |
| Device battery | 56 |
| Transformer | 58 |
| Blank | 59 |
| Transverse Axis- Housing | 60 |
| Longitudinal Axis - Housing | 61 |
| Ground prong (male) | 62 |
| Blade | 63 |
| Column 1 | 64 |
| Column 2 | 65 |
| Row 1 | 66 |
| Row 2 | 67 |
| Ground connection (female) | 68 |
| Digital Timer Display | 69 |
| Diode Bridge | 70 |
| Standard Capacitor | 72 |
| Low Voltage Resistor | 74 |
| First Low Voltage Converting Capacitor | 76 |

-continued

DETAILED DESCRIPTION - LISTING OF ELEMENTS

| Element Description | Element Number |
|---|---|
| Second Low Voltage Converting Capacitor | 76a |
| Low Voltage Diode | 78 |
| Voltage Limiting Display Diode | 80 |
| Voltage Limiting Display Resistor | 82 |
| First LED Display | 84 |
| Second LED Display | 86 |
| Microprocessor | 88 |
| First Initiation Resistor | 90 |
| First Initiation Resistor | 90a |
| First Initiation Resistor | 90b |
| Programming Port | 92 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Referring to FIGS. 1-5, wherein like reference numerals designate identical or corresponding parts throughout the several views, and to the following description, it can be understood that the present invention may be embodied in an electrical outlet unit 1 which comprises a housing 2 which includes a first side 3 and a second side 4. A transverse axis 60 extends between the first side 3 and the second side 4. The housing 2 further includes a first end 5 and a second end 6. A longitudinal axis 61 extends between the first end 5 and the second end 6. Housing 2 further includes a front 7 and a rear 8. Housing 2 can be formed in various colors and of various materials. As required by codes and the market, the housing may also be constructed of non-conductive plastic and or insulated. FIGS. 1-5 are of an embodiment of an electrical outlet unit 1 which is to be mounted to a standard AC power outlet 10 (commonly referred to as a "wall socket") having 2 or 4 electrical receptacles during operation. A wall mounted AC power electrical receptacle is not shown as they are well known in the art and similar in design to the electrical receptacles 42 shown herein. The electrical charge outlet unit as shown in FIGS. 1-5 includes a second grounding prong 62a mounted to the housing which serves to fully engage the outlets to which the unit may be mounted stabilizing the electrical outlet unit 1. Additionally, the second grounding prong may be electrically connected to the grounding circuit.

Figure 6:
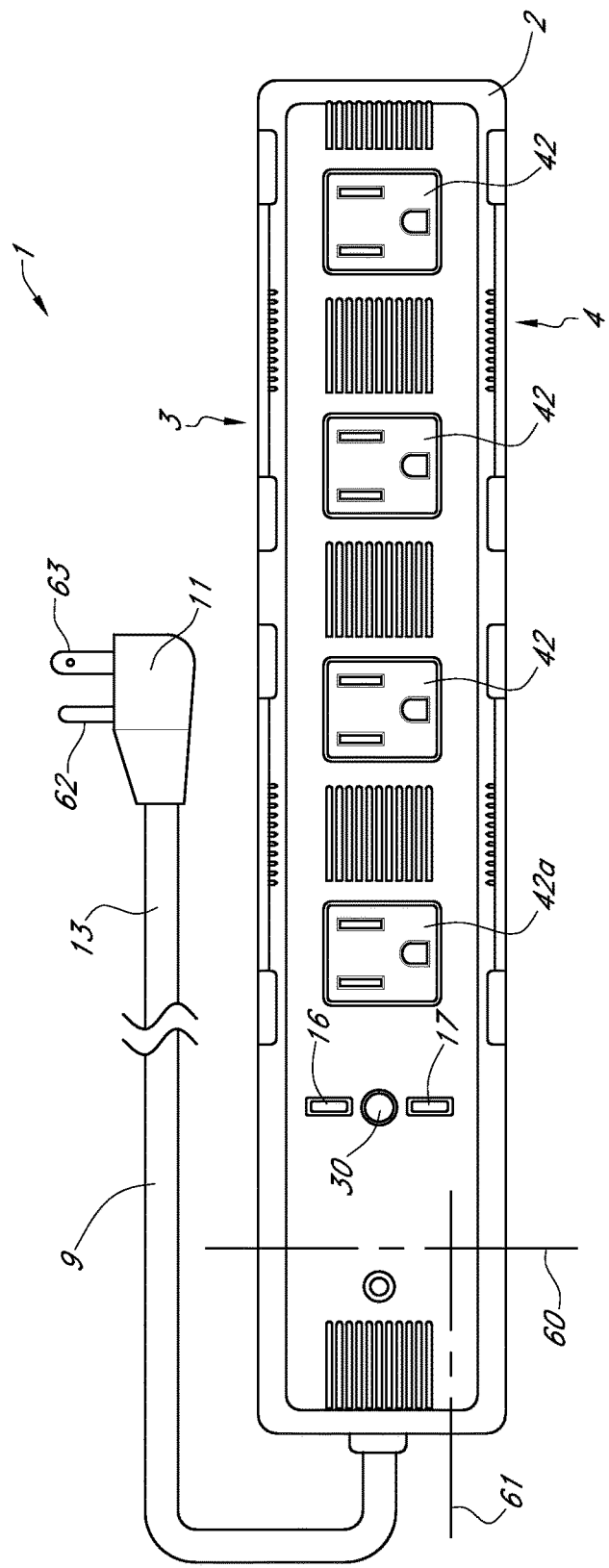
FIG. 6 is a front view of another embodiment of an electrical outlet unit subject of the present patent application.
Figure 7:
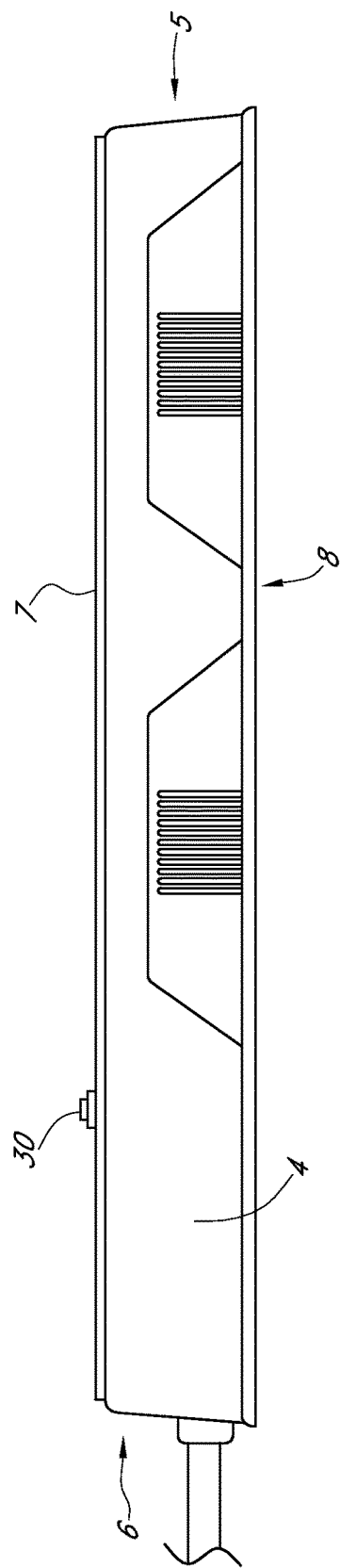
FIG. 7 is a side view of the electrical outlet unit of FIG. 6.

Referring to FIGS. 6-7, wherein like reference numerals designate identical or corresponding parts throughout the several views, and to the following description, it should be understood that the present invention, without limitation, may also be embodied in an electrical outlet unit 1 having a cord 9 attached therein which also comprises a housing 2 which includes a first side 3 and a second side 4. A transverse axis 60 extends between the first side 3 and the second side 4. The housing 2 further includes a first end 5 and a second end 6. A longitudinal axis 61 extends between the first end 5 and the second end 6. Housing 2 further includes a front 7 and a rear 8. The housing 2 of this embodiment may also be formed in various colors and of various materials. As required by codes and the market, this housing 2 may also be constructed of non-conductive plastic and or insulated. The power cord 9 is connected to housing 2 and has a connection 11 on a distal end 13 thereof that is shaped and sized to electrically connect to an AC power source 10 such as an electrical outlet receptacle of a home, office or the like. One of ordinary skill will appreciate that the embodiments shown in either FIG. 1 or 6 may have more or less grounded electrical receptacles.

Figure 1:
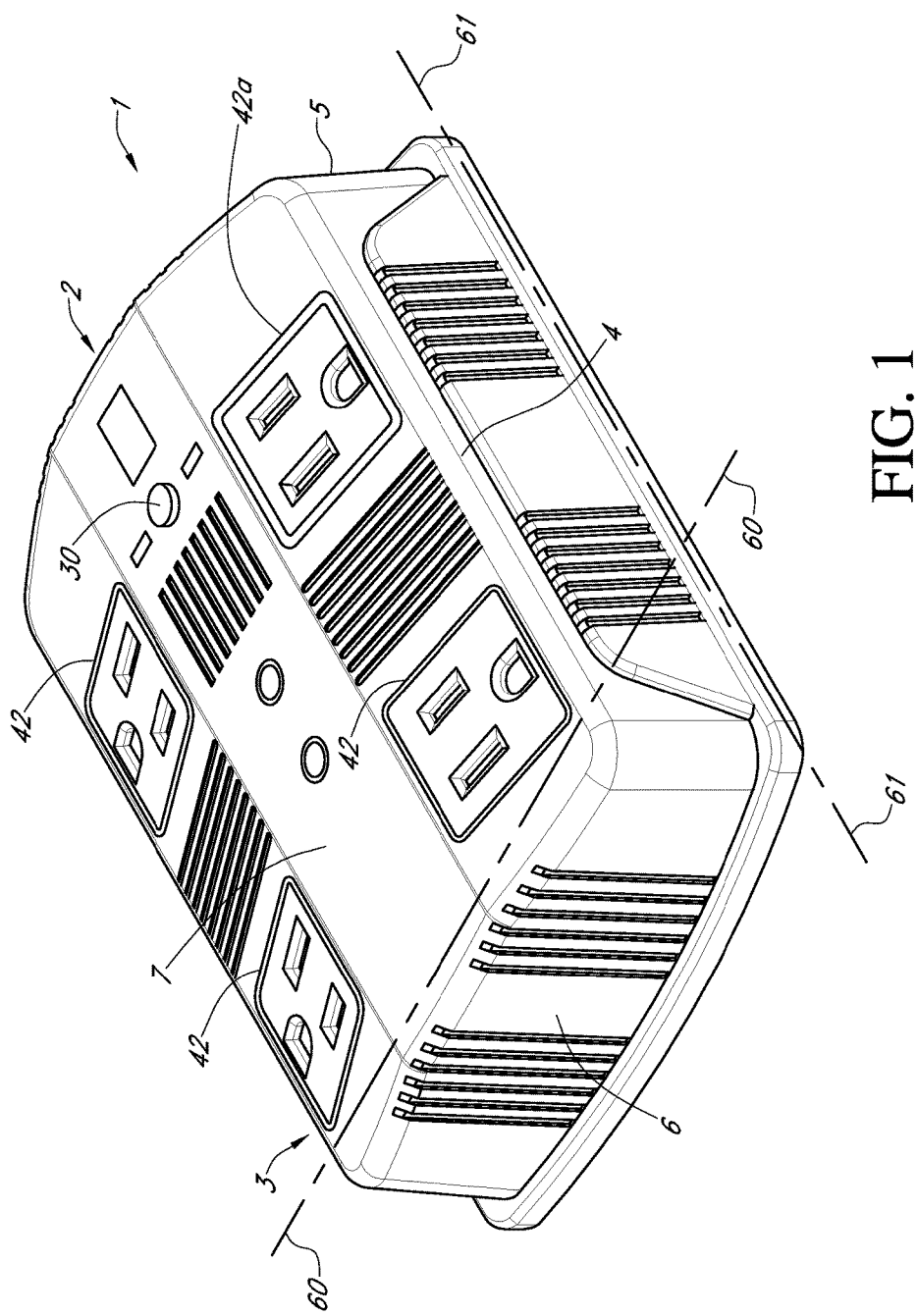
FIG. 1 is a perspective view of one embodiment of an electrical outlet unit subject of the present patent application.
Figure 2:
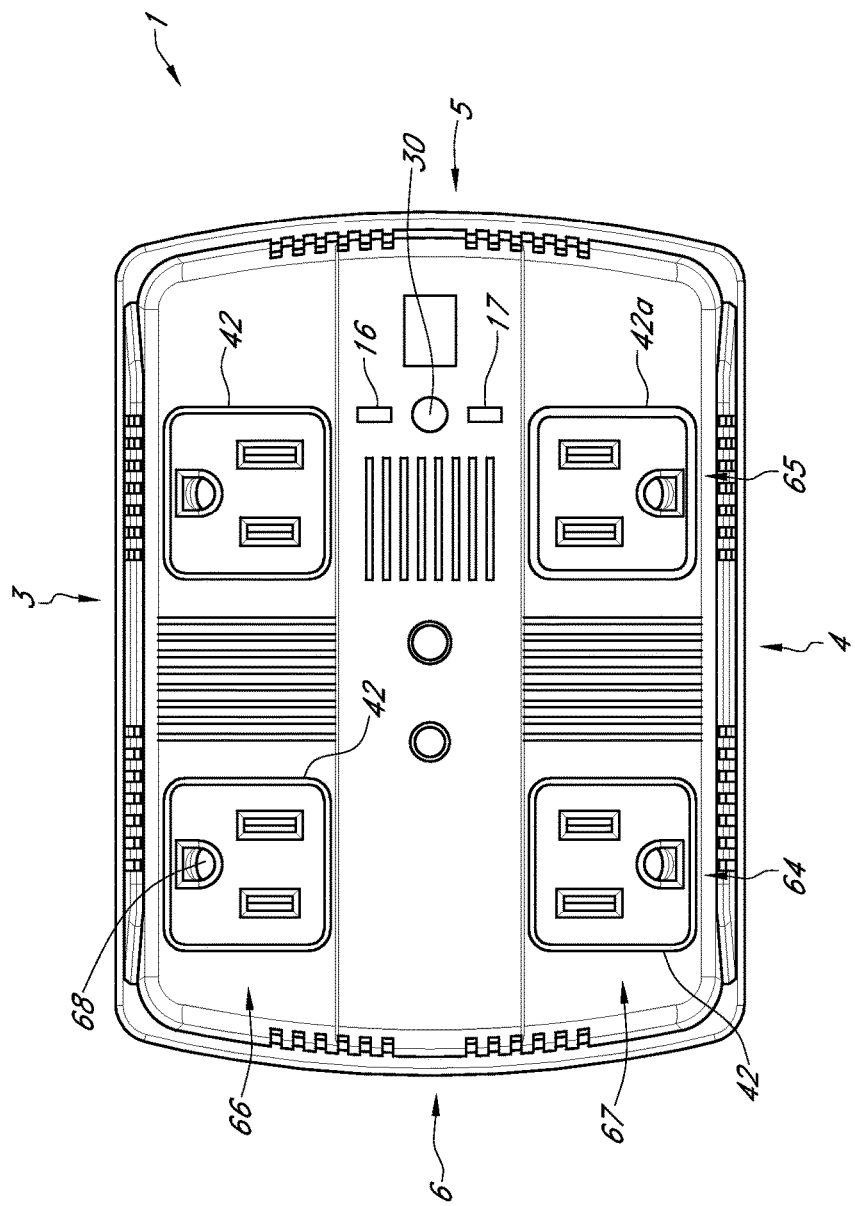
FIG. 2 is a front view of the electrical outlet unit of FIG. 1.
Figure 3:
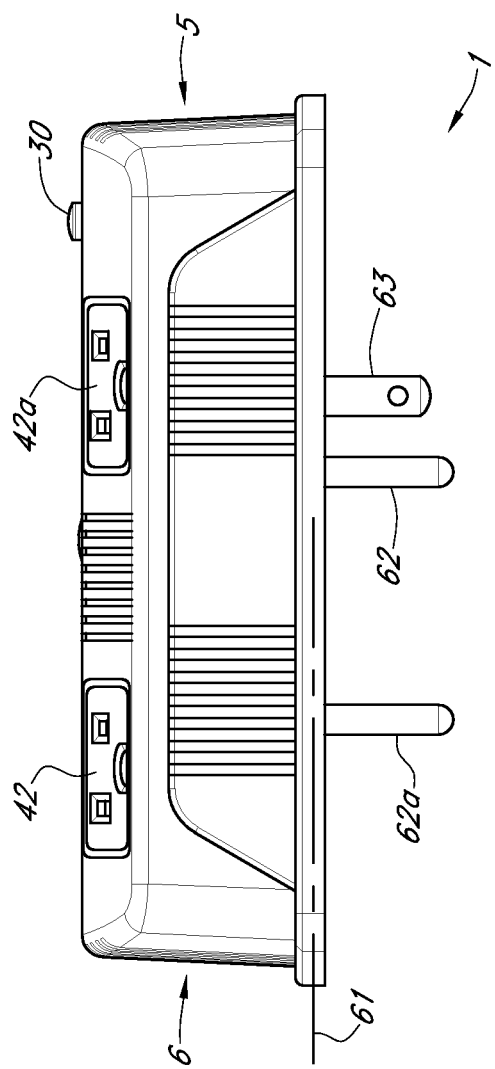
FIG. 3 is a side view of the electrical outlet unit of FIG. 1.
Figure 4:
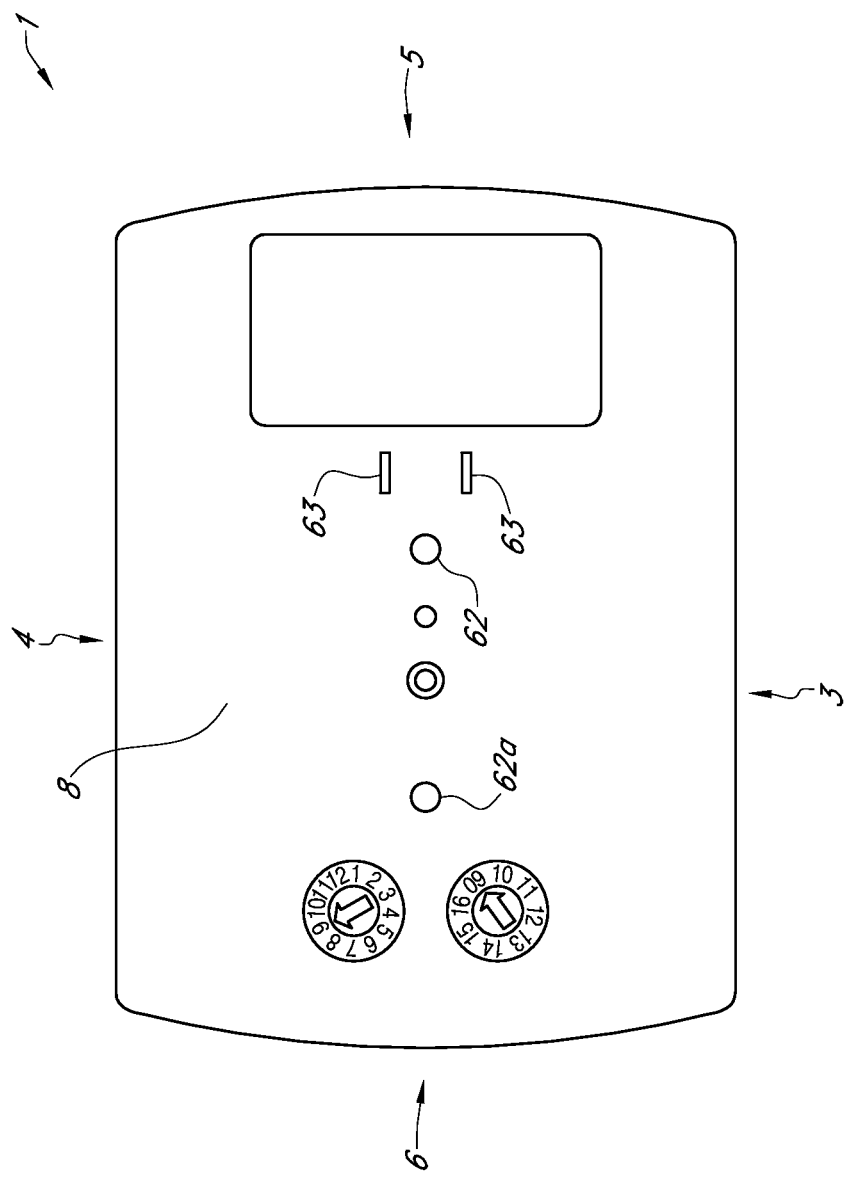
FIG. 4 is a view of the rear side of the electrical outlet unit of FIG. 1
Figure 5:
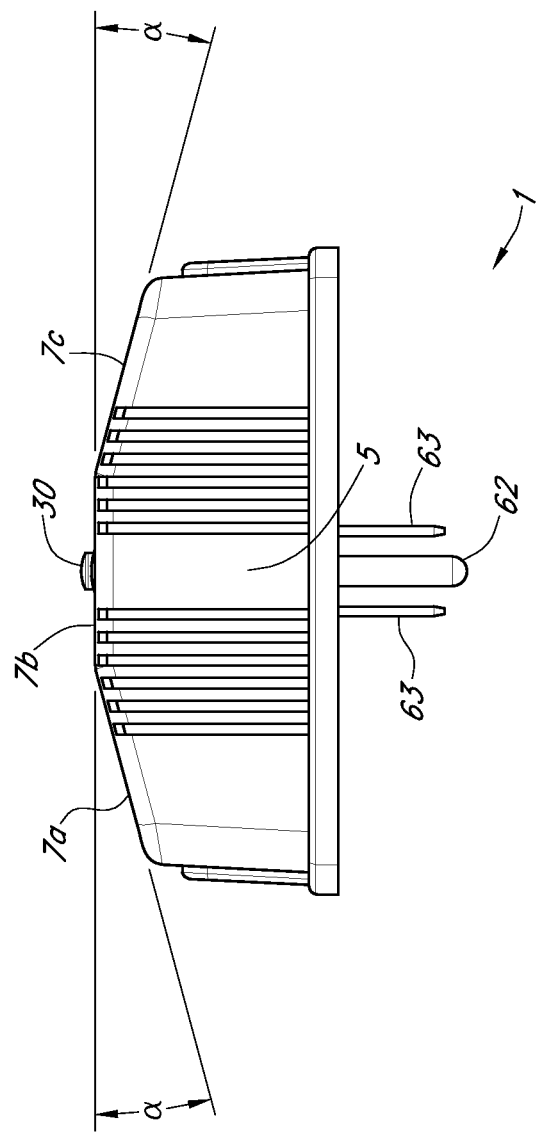
FIG. 5 is a top view of the electrical outlet unit of FIG. 1.

A plurality of grounded electrical outlet receptacles 42 (alternatively referred to as AC power outlets) are located on the front of housing 2. In the example shown in FIGS. 1-5, the grounded electrical receptacles are arranged in two columns 64 and 65 and two rows 66 and 67. As can be understood from FIG. 1, the columns 64, 65 are spaced apart from each other along the transverse axis 60 of the housing and the rows 66, 67 are spaced apart from each other along the longitudinal axis 61 of the housing 2. Each outlet receptacle 42 has a ground connection, such as ground connection 68. As best shown in FIGS. 1 and 5, profile of the front side (face) 7 of the electrical outlet unit 1 is non-linear and allows positioning the electrical outlet receptacles at an angle below the transverse axis 60 of the front side 7. The advantage of this profile is that it allows for insertion and use of cords having a bulky connection end at the distal end of the cord therein (not shown). FIG. 5 illustrates the angled relation of front side 7 having faces 7a, 7b, and 7c.

Electrical Outlet Unit 1 includes a timer unit 25 within the housing 2. Timer unit 25 includes an electrical circuit which may be connected to each outlet receptacle of the plurality of grounded electrical outlet receptacles 42 to control operation of those receptacles as will be understood from the teaching of this disclosure. As disclosed and claimed herein, the exemplary embodiments, without limitation, have the timer unit 25 connected to all but one of the grounded electrical receptacles. Having one grounded receptacle always "hot" allows the electrical outlet unit to function as surge protector when the timing function is not beneficial or needed.

An electrical surge protector circuit 12 is located in housing 2 and is electrically connected to each outlet receptacle of the plurality of grounded electrical outlet receptacles 42. The surge protector circuit 12 is common to power strips and thus will not be further discussed as those skilled in the art will understand what elements and connections are required for the surge protector circuit 12. A grounding circuit electrically connects the grounding circuit of each of the grounded outlet receptacles to the grounded conductor of the power cord 9 or the ground prongs 62 and blades 63 of the wall mounted embodiment of the electrical outlet unit 1.

An initiation switch 30 is located on the housing 2. As indicated in FIGS. 1, 6, 8A and 8B, initiation switch 30 is electrically interposed between power 22 and the electrical surge protector circuit 12 and between power 22 and the timer unit circuit 25. Initiation switch 30 includes an "off" position which electrically disconnects the electrical surge protector circuit 12 from power 22 when the initiation switch 30 is in an "off" condition, a "charging" position which electrically connects the electrical surge protector circuit 12 to the power supply 22 when the initiation switch 30 is in a "charging" condition which electrically connects the timer unit 25 to power 22 when the initiation switch 30 is in a "charging" condition. The "charging" position and the "off" position are mutually exclusive of each other so that when the initiation switch is in one of the positions, it cannot be in any other of the positions. That is, if the initiation switch 30 is in a "charging" (on) configuration, the timer unit 25 will be activated and the electrical outlet receptacles will be powered during the charging cycle. If the initiation switch 30 is "off", the timer unit 25 will be de-activated and the electrical outlet receptacles connected to the timer unit 25 will not be powered.

Operation and Circuitry of a First Illustrative Embodiment

Figure 8A:
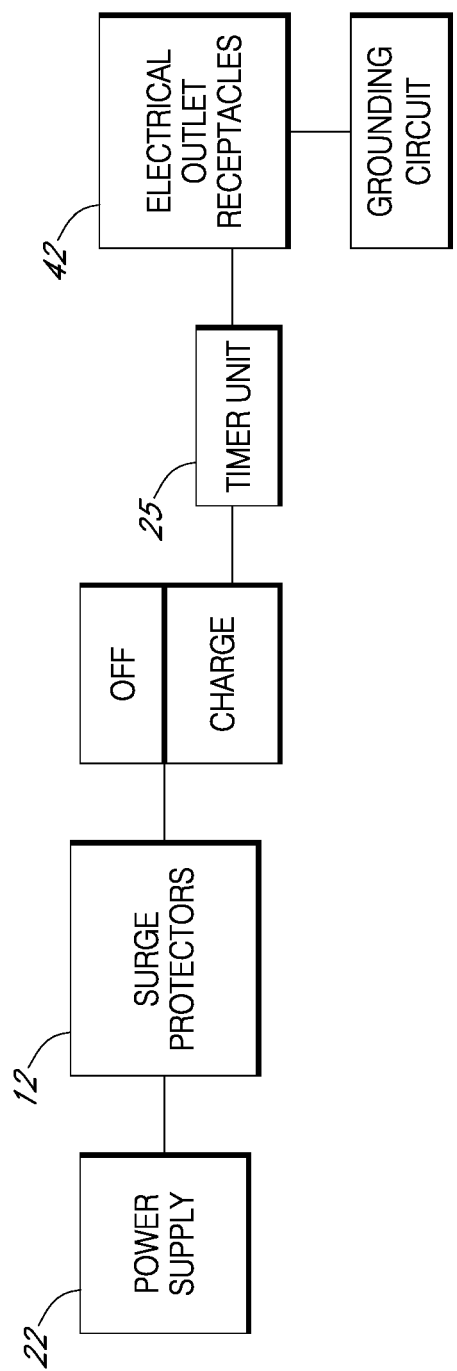
FIG. 8A is a simplified diagram of an illustrative electrical system for an electrical outlet receptacle connected to and or controlled by the timer unit.

FIGS. 8A, 9 and 11A, and the descriptions that follow, describe a first illustrative embodiment of the electrical outlet unit circuit 44 of the electrical outlet 1. As is well known to those skilled in the art, several circuitry components may be used in conjunction with one another depending on the proper values to which circuitry can isolate power at a desired time. As shown in the various figures herein, when the alternating current (AC) source 10 is connected to a standard household 125 volt electrical outlet, electricity is sent to the surge protector circuit 12. As long as the fuse 20 has not opened by a short, the status indicator LED 16 will illuminate indicating the surge protector is functioning. A resistor 14 is used to limit the electrical current through the status indicator LED 16, to keep the status indicator LED 16 from failing due to excessive electrical current. A varistor 18 reduces resistance if or when voltage reaches an excessive trip point. When the voltage trip point is reached, the varistor 18 conducts or discharges electricity. Through conduction or discharge through varistor 18 the resulting power surge between AC source 10 hot line 46 and the AC source 10 neutral line 48 is shorted (absorbed). The shortage provides protection to devices plugged into Power Outlets 42 from a power surge. Trip voltage is reduced each time the trip point of the varistor 18 is reached. This voltage reduction eventually reduces the trip voltage to the applied line voltage. The varistor 18 will cause a direct short between the AC source 10 hot line 46 and AC source 10 neutral line 48 causing the fuse 20 to burn open once trip voltage is reduced to line voltage. When said fuse 20 has opened, the status indicator LED 16 will turn off indicating surge protection of the electrical outlet unit circuit 12 is no longer functioning.

Concurrently, when AC source 10 is connected to a standard household 125 volt electrical outlet, electricity is also sent to the power supply 22. The power supply transformer 58 reduces the 125 volts AC down to 12 volts AC. The AC voltage is rectified to pulsating DC by rectifying diode 26 and then filtered to DC by a fixed polarized capacitor 28. This low voltage DC is then used by the RC timer 32 which is primarily composed of a RC timer fixed polarized capacitor 28a, and RC timer resistor 14a.

The charge cycle transmission begins through engagement of initiation switch 30 allowing current to flow through the initiation switch 30. As one of ordinary skill will appreciate, the initiation switch may be a push button, a throw switch or any type of switch that may be engaged by a user. As current flows through initiation switch 30, the RC timer fixed polarized capacitor 28a is charged to the power supply 22 Voltage. When the initiation switch 30 is released an RC timer resistor 14a will slowly discharge said RC timer fixed polarized capacitor 28a. The discharge time of the preferred embodiment has been set but not limited to four hours by the RC timer resistor 14a and the RC timer fixed polarized capacitor 28a. One of ordinary skill will appreciate that other times may be selected and the selection of four (4) hours is in no way limiting.

A relay driver 34 is an N channel FET used as an output driver by the RC Timer 32. While the charge in the RC timer fixed polarized capacitor 28a is above the relay driver 34 gate to source voltage threshold, the relay driver 34 will conduct turning on the relay 36. When the relay 36 is on, the relay contacts are closed sending AC power from the AC source 10 to the charging status LED 17 indicator. As a result, the charging status LED 17 indicates the charge cycle is in progress. A series relay resistor 14b is used to limit the electrical current through the charging status LED 17, to keep the charging status LED 17 from failing from excessive electrical current. Additionally, while the relay 36 contacts 40 are closed, AC power is sent to the AC outlets 42. This location is where battery chargers are plugged into the electrical unit outlet 1. After the set, but not limited to, four hours of charging in the RC timer fixed polarized capacitor 28a will drop below the gate to source voltage threshold of the relay driver 34. As a result, this will cause the relay driver 34 to cease conducting, turning off relay 36 causing the contacts 40 to open. When the contacts 40 open AC power is disconnected from charging status indicator LED 17 causing the light to go out indicating the charge cycle is complete. When the contacts 40 open, AC power is removed from the AC outlets turning off any device plugged into the electrical unit outlet 1.

When relay 36 turns off, the collapsing magnetic field of the relay coil 38 will cause voltage spike which has the potential to kill the relay driver 34. To protect the relay driver 34 a parallel relay snubbing diode 26a has been connected across the relay coil 38 which negates the voltage spike generated by the coil. FIG. 11A illustrates an illustrative block diagram of the combination of circuits illustrated by FIG. 9 working together to form a timing unit 25 using an RC timer circuit 32 and as relay circuit 36 in an illustrative embodiment of an electrical unit outlet 1.

Operation and Circuitry of a Second Illustrative Embodiment

Figure 8B:
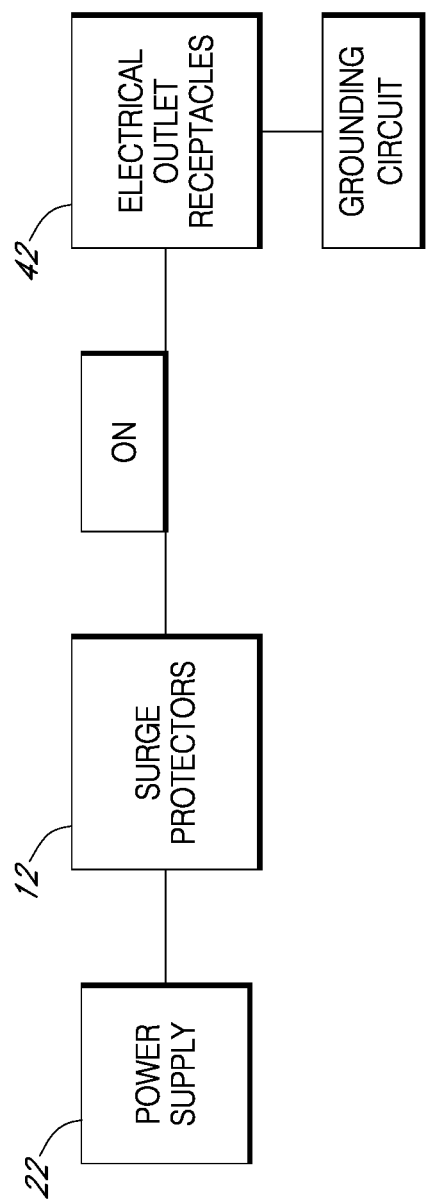
FIG. 8B is a simplified diagram of an illustrative electrical system for an electrical outlet receptacle not connected to and or controlled by the timer unit.

FIGS. 8B, 10 and 11B, and the descriptions that follow, describe a second illustrative embodiment of the electrical outlet unit circuit 44. In this embodiment, a fuse 20a was added to the circuit's power supply to isolate electricity flow to the power supply circuit 22 when the fuse 20a is not opened by a short in the circuit. The power supply circuit 22 in the second embodiment is now comprised of a power supply rectifying diode 26, a zener diode 24, a second zener diode 24a, a power supply capacitor 28, a first power supply resistor 14c, and a second power supply resistor 14d. The AC voltage is then rectified to pulsating DC by power supply rectifying diode 26 and then regulated to approximately 15 Volts by a first and second power supply zener diodes (24, 24a). The second zener diode 24a output is then filtered to DC by a capacitor 28. The filtered DC is the power source used by an optocoupler 52 which acts an opto-isolator. As one of ordinary skill will appreciate, the optocoupler 52 uses an optical transmission path to transfer a signal between the various elements of the circuitry while maintaining electrical isolation because the signal goes from an electrical signal to an optical signal back to an electrical signal, electrical contact along the circuit path is broken.

A resistor 14d is used to limit the current through optocoupler 52 on the input side. The low voltage pulsating DC output of a first zener diode 24 is used by the RC timer 32, comprising of a capacitor 28a and a resistor 14a. The RC timer 32 controls the length of the charge cycle for the devices connected to the electrical outlet unit circuit's AC power outlets 42. When the push switch 30 is engaged, current flows through, charging a capacitor 28a to the added second zener diode 24a voltage of 15 Volts. The power supply resistor 14c is used to limit the current rushing in from the RC timer capacitor 28a. When the initiation push switch 30 is released, the resistor 14a will slowly discharge RC timer capacitor 28a. While the charge in the RC timer capacitor 28a is above the relay driver 34 gate to source voltage threshold, the relay driver 34 will conduct turning the optocoupler 52 on, which in turn powers up the relay 36. The optocoupler 52 will turn off, in turn, turning off the relay 36 causing the contacts to open when the relay driver 34 stops conducting at the end of a charge cycle. FIG. 11B illustrates an illustrative block diagram of the combination of circuits illustrated by FIG. 8B and FIG. 10 working together to form another version of electrical unit outlet 1.

Operation and Circuitry of a Third Illustrative Embodiment

FIGS. 12 and 13, and the written description that follows, describe a third illustrative embodiment of the electrical outlet unit circuit 44 in which the duration of charging may be adjusted (referred to by its trade name, "Adjustable Take Charge" by applicant, without limitation). In FIG. 12, when the A.C. source is connected to a household electrical outlet, electricity is sent to the Surge Protector circuit. As long as the fuse 20 has not opened by a short, the Status Indicator 16 will illuminate indicating the surge protector is functioning. A resistor 14 may be used to limit the electrical current through the diode 16, to keep the diode 16 from failing from excessive electrical current. The varistors 18 are all in parallel and function as one to protect against a voltage surge between A.C. hot and ground. Additionally varistors 18a are all in parallel and function as one to protect against a voltage surge between A.C. hot and neutral. The resistance of either group of varistors reduces quickly when the surge voltage reaches a certain level called the trip point. Once this voltage trip point is reached the varistors starts to conduct, shorting the power surge from the A.C. hot to the A.C. neutral line or from the A.C. hot to ground. Thereby protecting devices plugged into the electrical outlet unit circuit 44 from the power surge. Each time the trip point of the varistors is reached, the trip voltage is reduced. Eventually the trip voltage will be reduced to the applied line voltage. When this happens the varistors will cause a direct short between the A.C. hot and neutral or the A.C. hot and ground causing the fuse 20 to burn open. Once the fuse 20 has opened, the Status Indicator 16 will go out indicating the surge protection circuit of the device is no longer functioning.

Additionally, as long as the fuse 20a has not opened by a short, when the A.C. Source is connected to a household 125 Volt electrical outlet, electricity is also sent to the Power Supply Circuit 22. The Power Supply Circuit 22 is composed of the following components including a fuse 20a, a power supply diode 24, a power supply capacitor 28, a first power supply resistor 14c, a diode bridge 70, power supply rectifying diodes 26, and power supply capacitors 28. The Power Supply circuit 22 has two outputs, one is 24 Volts D.C. and the other is high voltage which is close to the applied A.C. voltage. The high voltage output is used by the displays after first being rectified to pulsating D.C. by power supply diode 24. The applied AC voltage is also sent to power supply capacitors 28 and first power supply resistor 14c. The power supply capacitors 28 acts as a charge pump, passing pulses of power from the AC source on to the rest of the Power Supply circuit 22. First power supply resistor 14c is used as a biasing resistor for power supply capacitor 28. The pulses of A.C. voltage from power supply capacitor 28a are then rectified to pulsating D.C. by a diode bridge 70. The pulsating D.C. voltage is then filtered to D.C. by two capacitors (71, 72) connected in series. The filtered D.C. Voltage is then regulated to 24 Volts by the first and second power supply zener diodes 24 and 24a. This filtered and regulated 24 Volts D.C. is the power source used by Low Voltage Supply and to power the output relay 38.

The Low Voltage Supply takes the 24 Volts D.C. from the Power Supply and regulates it down to 5 Volts DC to be used by the processor and it peripherals. The Low Voltage Supply is comprised of a low voltage resistor 74, and two low voltage capacitors 76 and 76a connected in parallel with the low voltage diode 78. The low voltage resistor 74 is used to provide the 19 Volt drop from the 24 Volts D.C. to the 5 Volts D.C. of the Low Voltage Supply. The low voltage diode 78 is used to regulate the Low Voltage Supply to 5 Volts D.C. by constantly adjusting the amount of current flowing through resistor 74 to produce a 19 Volt drop. Capacitors 76 and 76a are used as filter capacitors for the Low Voltage Supply.

The output of the electrical outlet unit circuit is comprised of relay coil 38, parallel relay snubbing diode 26a, and relay driver 34. To turn on the output, voltage is sent from the processor to the input of the transistor 34, thus turning on transistor 34. When 34 turns on it supplies the ground for the coil of relay 38 thereby energizing the coil of 38. When the coil of 38 is energized the relay contacts close. With the contacts of relay 38 closed the applied A.C. Voltage is sent to any device plugged into the switched outlets on the electrical outlet unit circuit. To then turn the output off the processor removes the voltage on the input to transistor 34. This removes the ground to the coil of relay 38. With ground removed from the coil of 38 the relay contacts of 38 open. When the contacts of relay 38 open the applied A.C. Voltage is removed from any device plugged into the switched outlets on the electrical outlet unit circuit. Also when ground is removed from the coil the resulting collapsing magnetic field of the coil produces a voltage spike which could destroy 34. To protect 34 a diode 26a has been connected across the relay coil which snubs the voltage spike the coil generates.

The display is shown in FIG. 13 and is comprised of transistors 80, resistors 82, and two LED display panels 84. The display is used to show current status of the electrical outlet unit circuit 44. There are two 7 segment displays 84 and 84a which are used to show either the time remaining on a cycle or to display two dashes to indicate the unit is off. The displays are common anode receiving their power from 24 of the Power Supply. To turn on a segment its corresponding transistor 80 is turned on by the processor 88. When a transistor is turned on it supplies ground to the segment to be turned on. Between the display segment and the transistor 80 is a resistor 82. The resistor 82 is used to limit the current in the display segments.

The controller is comprised of resistors 90, 90a, 90b, initiation switch 30, and microprocessor 88. The controller handles all inputs, outputs and timing of the electrical outlet unit circuit 44. The resistor 90a is used as a current limit to protect the data port on the processor. The resistor 90b is used to bias the input to 34 to ground as its normal state which keeps the output turned off. To start a charge cycle, the Initiation Switch 30 is pressed which supplies a logic level of zero to U1 the processor. To do this the biasing resistor 90 that normally supplies logic level of one is pulled to ground by the closure of Initiation Switch 30. When the processor 88 receives the start signal it loads 1 hour of time into the internal timer of the processor 88, updates the displays 84 and 86 to read "1.0", and turns on the output via 34. The processor 88 then waits for the release of the initiation switch 34. Upon release of the initiation switch 34 the internal timers of 88 start counting down the time. As the internal timer of 88 counts down the displays 84 and 86 are updated to show the remaining time. When the internal timer of 88 reaches zero the output is turned off. The processor 88 also sets the displays 84 and 86 to display dashes to indicate the timing is done and the switched outputs are turned off.

The Programming Port 92 of the processor 88 is used when the unit is first assembled to load the program software into the internal memory of the processor. The Programming Port 92 can also be used to update the software with later versions.

While there has been shown and described what is the preferred embodiment of this invention, it will be obvious to those skilled in the art that various changes and modifications may be made without departing from the broader aspects of this invention. For instance, although a relay has been used to electrically isolate the power source from the charger, a Triac, or another solid state device could be used. Furthermore, the Processor could be replaced with a solid state timer or a mechanical timer. Additionally the Initiation Switch 30 could be remote mounted on a stand alone unit. This would allow the electrical outlet unit circuit 44 to be mounted in an outlet that is not easily assessable. This remote mounted Initiation Switch could be linked to the Take Charge by wire(s) or a wireless system.

Furthermore, although not shown, one of ordinary skill will appreciate that the electrical outlet unit may be embodied in any one of several implementations including as a stand-alone unit mounted in a plastic housing with at least one cord connectable to an ac outlet and having at least one, and preferably several, ac receptacles into which the device charger 54 for a device having rechargeable batteries 56 may be connected. In another embodiment, not shown, the initiation switch may also be remotely mounted as a stand-alone unit allowing the power isolation circuit 44 of the electrical unit outlet 1, to be mounted in an outlet that is not easily accessible. This remote mounted initiation switch could be linked to the electrical unit outlet 1, power isolation circuit 44, by wire(s) or a wireless system.

Operation and Circuitry of a Fourth Illustrative Embodiment

FIG. 14 and the written description that follows, describe a fourth illustrative embodiment of the electrical outlet unit circuit 44 in which the duration of charging may be adjusted and/or managed. In this embodiment, referred to generally and interchangeably as either a "Charge Stop" or a "Take Charge" by applicant, the problem addressed is restoring power to the battery charger after a longer period of time for a shorter "charging" period to maintain a battery at a full charge. By not leaving the battery charger on all the time power savings are made and by means of abbreviated charging cycles the battery is maintained at full charge. In the present invention, an electromechanical device called a relay is used to turn on and off the charger. The relay has a set of electrical contacts that when closed allow electrical power to be supplied to the battery charger. When the electrical contacts are open they isolate the electrical power source from the battery charger. An additional circuit called the command circuit, controls whether the relay's electrical contacts are open or closed. The command circuit is comprised of an initiation switch, a processor, surge suppressors, status indicators, and a relay output driver.

All of these components are mounted inside a plastic enclosure called the housing. The housing is designed such that it will plug into any standard grounded 110-125 Volt A.C. outlet. The housing also has from 1 to 6 receptacles that allow the battery chargers to be plugged in. The housing also has additional openings for the initiation switch and for the status indicating LED to protrude through the case.

Once the electrical cord from the housing has been plugged into a functioning outlet, electricity is sent to the command circuit. The command circuit will then illuminate a status indicator LED to indicate the surge protection circuit is functioning properly. The surge suppression circuit will protect against voltage surges, independent of the initiation or operation of the charge cycle, while the Take Charge with Battery Maintenance is plugged in and receiving power. If this LED does not illuminate it indicates a fault condition and the Take Charge with Battery Maintenance should be discarded. With the Take Charge with Battery Maintenance plugged in and functioning properly, from 1 to 6 battery chargers are then plugged in into the receptacles on the Take Charge with Battery Maintenance. Then if at least one of the battery chargers has been connected to its associated device, the initiation switch would be used to start a charging cycle.

In the present invention this is done by pressing the start push-button, but in no way is this limiting as one of ordinary skill in the art will appreciate. Once a charging cycle is started, an electrical signal is sent to turn on the status indicator and a signal is sent to turn on the relay output circuit. This closes the electrical contacts on the relay, sending electrical power to the battery charger(s) connected to the Take Charge with Battery Maintenance. Additionally the battery charging time is loaded into a digital timer inside the processor. Once loaded, this digital timer starts counting down. When the digital timer reaches zero, the relay output driver is turned off. When the relay driver turns off, the relay contacts open, turning off all battery chargers connected to the Take Charge with Battery Maintenance completing the charging cycle.

At completion of the charging cycle the Take Charge with Battery Maintenance now enters into maintenance mode. While in maintenance mode the device will continually repeat maintenance cycles. A maintenance cycle is made up of a pause time and an abbreviated charge time. Each time a maintenance cycle is started the digital counter starts timing down the pause time. In the current device the pause time is set to 72 hours, however, in no way is this limiting to the present invention as other periods of time, longer or shorter in duration, could also be selected. While the pause time is being counted down the status indicator flashes. When the pause time has been counted down the relay output driver is turned on causing the relay contacts to close. While the relay contacts are closed, power is once again sent to the battery chargers. The digital timer now starts timing down the abbreviated charging time. While the abbreviated charging time is being counted down the status indicator is turned on. In the current device the abbreviated charging time is 20 minutes. When the abbreviated charge time has been counted down the output relay driver is turned off causing the relay contacts to open. When the relay contacts open the battery charger(s) are turned off thus completing a maintenance cycle. Pressing the initiation switch during either the initial charge cycle or while in maintenance mode will cause the unit to turn off. When the Take Charge with Battery Maintenance is turned off the relay and the status indicator are turned off, which also turns off any devices plugged into the switched outlets.

As one of ordinary skill will appreciate, the operation and circuitry of the present embodiment is similar to the third illustrative embodiment shown at FIGS. 12-13 as compared to FIG. 14. The output of the electrical outlet unit circuit is comprised of relay coil 38, parallel relay snubbing diode 26a, and relay driver 34. To turn on the output, voltage is sent from the processor to the input of the transistor 34, thus turning on transistor 34. When 34 turns on it supplies the ground for the coil of relay 38 thereby energizing the coil of 38. When the coil of 38 is energized the relay contacts close. With the contacts of relay 38 closed the applied A.C. Voltage is sent to any device plugged into the switched outlets on Take Charge with Battery Maintenance. To then turn the output off the processor removes the voltage on the input to transistor 34. This removes the ground to the coil of relay 38. With ground removed from the coil of 38 the relay contacts of 38 open. When the contacts of relay 38 open the applied A.C. Voltage is removed from any device plugged into the switched outlets on the Take Charge with Battery Maintenance. Also when ground is removed from the coil the resulting collapsing magnetic field of the coil produces a voltage spike which could destroy 34. To protect 34 a diode 26a has been connected across the relay coil which snubs the voltage spike the coil generates.

Although the display for this embodiment is not shown, it operates similar to the display shown in FIG. 13 and is comprised of transistors 80, resistors 82, and two LED display panels 84. The display may be used to show current status of the electrical outlet unit circuit 44. In this embodiment, the displays 84 and 84a are used to show either the time remaining on a cycle or to display whether the unit is providing a short charge for maintenance or whether the unit is off. The displays are common anode receiving their power from 24 of the Power Supply. To turn on a segment its corresponding transistor is turned on by the processor 88. When a transistor is turned on it supplies ground to the segment to be turned on. Between the display segment and the transistor is a resistor 82. The resistor is used to limit the current in the display segments.

The controller is comprised of resistors 90, 90a, 90b, initiation switch 30, and microprocessor 88. The controller handles all inputs, outputs and timing of the electrical outlet unit circuit 44. The resistor 90a is used as a current limit to protect the data port on the microprocessor 88. The resistor 90b is used to bias the input to 34 to ground as its normal state which keeps the output turned off. To start a charge cycle, the initiation switch 30 is pressed which supplies a logic level of zero to microprocessor 88. To do this the biasing resistor 90 that normally supplies logic level of one is pulled to ground by the closure of initiation switch 30. When the microprocessor 88 receives the start signal it loads 3.25 h hour of time into the internal timer of the microprocessor 88, updates the displays 84 and 86 to read "1.0", and turns on the output via 34. The processor 88 then waits for the release of the initiation switch 34. Upon release of the initiation switch 34 the internal timers of microprocessor 88 start counting down the time. When the internal timer of microprocessor 88 reaches zero the output is turned off. The internal timer is then loaded with 72 hours and starts counting down. It will be apparent to one of ordinary skill, that other durations of time may selected and or preferred and the duration selected herein is in no way limiting.

While the 72 hours is being counted down the displays 84 and 86 are repeatedly turned on and off as to make the LED flash. After the 72 hours have been counted down, the microprocessor 88 turns on the output via transistor 80 and status indicator 82. The internal timer is then loaded with 20 minutes and starts counting down. When the internal timer of microprocessor 88 reaches zero the output is turned off and the internal timer is set to 72 hours again. This 72 hour pause time followed by 20 minutes of charging continues to repeat until the initiation switch 30 is pressed and released again. When the initiation switch 30 is pressed while a timing cycle is going on, the internal timer is cleared, the output is turned off, and the status indicator 82 is turned off completing the timing cycle.

| DETAILED DESCRIPTION - LISTING OF ELEMENTS FIGS. 16-21 | |
|---|---|
| Element Description | Element Number |
| Electrical Outlet Unit (docking base) | 1a |
| Electrical Outlet Unit (GFI) | 1b |
| Initiation Switch | 30 |
| Unit Reset Button | 31 |
| GFI Outlets | 42b |
| Appliance | 100 |
| Lamp | 100a |
| Appliance On/Off Switch | 101 |
| Docking Base Control Panel | 105 |
| USB Port(s) | 110 |
| GFI Test Switch | 111 |
| GFI Reset Switch | 112 |
| GFIC | 113 |
| Sensing Coil | 114 |
| Comparator | 115 |
| Trip Coil | 116 |

Operation and Circuitry of a Fifth Illustrative Embodiment—Docking Bay Electrical Outlet Unit Lamp In this embodiment of the electrical outlet unit 1 (docking base 1a), and its supporting elements and circuitry, as disclosed in the preceding embodiments at FIGS. 1, 9, 10, as well as FIGS. 11-15, is configured as an appliance 100, illustrated as lamp 100a, without limitation or restriction, providing surge protection and limiting the electrical power consumption of electrically connectable devices having rechargeable batteries by automatically removing the electrical power to the a/c outlets 42 of the electrical outlet unit 1 once charging of the attached devices is complete. As one of ordinary skill will appreciate, the embodiments illustrated herein are but one of a multitude of configurations that may be practiced without departure from the spirit and intent of the present disclosure.

FIG. 16 is a front view drawing of the appliance 100 configured as a lamp 100a with the electrical outlet unit 1 configured as a docking bay 1a in the base of the appliance 100. The docking bay 1a may be configured with multiple a/c charging outlets 42, as configured at FIG. 16 with two and as configured at FIG. 17, with four, one of which is always on 42a. Additionally, a USB port 110 and a push button to initiate the charge sequence 30 as well as location of an appliance on/off switch 101 for the lamp 100a may be included in the base of the appliance without limitation. As appliances 100 are well known, particularly lamp 100a, it is not necessary for the enclosed figures to include detailed call-outs for the typical elements as one of ordinary skill knows a lamp is comprised of common elements, including without limitation or restriction, light bulb(s), light socket(s), electrical connection(s), fuses and wires.

FIG. 17 provides further detail on how a docking base control panel 105 located at the base of the appliance 100b may be configured to include multiple a/c charging outlets 42, an initiation switch (start button) 30, multiple LEDs (16, 17) indicating the state of surge status (active/inactive) and charge status to indicate when charging is occurring. As shown, one of the a/c charging outlets may be configured to be "always on" or "hot" (42a) so to always provide electrical power and independent of the timing system controls. (Applicant, by way of reference, has assigned this configuration product number "UTC4 W") One of ordinary skill will appreciate the embodiments represented by FIG. 16 and FIG. 17, and their supporting circuitry may be configured in a multitude of ways as discussed further herein and may incorporate the circuitry and operation of FIGS. 8A, 8B, 9, 10, 11A, 11B, 12, 13 and 14 without limitation or restriction.

In a first configuration of this illustrative embodiment, the power supply to the appliance 100 used to energize the operation circuit of the appliance, for example the light bulb (not shown) of lamp 100a, is not subject to control by the timer unit 25 and/or RC timer circuit 32 and is not connected to the surge protection circuit 12. In this embodiment, the electrical outlet unit 1 and the appliance 100 function autonomously with the controls of the electrical outlet unit 1 directed exclusively to controlling the devices (not shown) connectable to the electrical outlets (42 or 42a) configured in the base of the appliance 100 therein. FIG. 18A provides a simplified flow diagram of an illustrative electrical outlet unit 1 configured as a docking bay 1b having the circuitry of FIG. 9 connected to a device having a rechargeable battery during charging, without limitation or restriction.

In a second configuration of this illustrative embodiment, the power supplied to the lamp from an A/C power source 10 used to energize the light bulb for lighting purposes will be subject to and connected between the surge protection circuit 12 and the timer circuits 32 therein allowing the user to control the amount of time the lamp is on allowing for a preset automatic shutdown sequence and also protecting the actual lamp, and the light bulb therein, from power surges. FIG. 18B provides a simplified flow diagram of an illustrative electrical outlet unit having the circuitry of FIG. 10 connected to a device having a rechargeable battery during charging.

FIG. 19 is another configuration of the present illustrative embodiment wherein the docking bay electrical outlet unit 1b includes a digital timer display 69 indicating the duration of charging. In this embodiment, the user may preset the amount of time the electrical outlet unit 1b may charge devices connected to the a/c electrical outlets 42. (See also the operation description for FIG. 15)

Operation and Circuitry of a Sixth Illustrative Embodiment

In this embodiment of the electrical outlet unit (1a), ground fault interrupter (GFI) or ground fault circuit interrupter (GFIC) technology and circuitry is incorporated into various configurations, including integration into sockets built into walls, integration into wall units for use with any power outlet as well as power strips and surge protectors.

GFI's are required by the electrical code for receptacles in bathrooms, some kitchen receptacles, some outside receptacles, and receptacles near swimming pools. A typical circuit breaker interrupts the circuit at 20 amperes, but it takes only about 100 milliamperes (mA) to electrocute a person in such a scenario. The GFI is designed to detect currents of a few mA and trip a breaker at the receptacle or at the breaker panel to remove the shock hazard. Ground fault interrupters are designed to protect from electrical shock by interrupting a household circuit when there is a difference in the currents in the "hot" and neutral wires. (not shown) A difference in current flow indicates that an abnormal diversion of current from the "hot" wire is occurring. When a circuit is functioning normally, all the return current from an appliance flows through the neutral wire, so the presence of a difference between "hot" and neutral currents represents a malfunction which in some circumstances could produce a dangerous or even lethal shock hazard. As shown in FIGS. 20 and 21, the GFI outlets 42b have a "test" button which causes a small difference between "hot" and neutral currents to test the GFIC. By way of illustration and without limitation, the UL requirement for a GFI is that it trip when there is 5 mA of leakage current. There is also a reset button 112 to use after it has been tripped.

Typically, GFI's are constructed so that the "hot" and neutral wires are passed through a sensing coil so that the currents in the two wires at any instant are traveling in opposite directions, giving a net zero current in the coil if the two currents are exactly equal. Since a current-carrying wire produces an AC magnetic field external to the wire, a non-zero current would induce a voltage in the sensing coil 114. In a typical GFI circuit, the voltage in the sensing coil is rectified and applied to the input of the comparator circuit, which may be an op-amp comparator, by way of illustration and without limitation. The comparator activates a trip coil which opens both the "hot" and neutral wires, thereby interrupting current flow in the circuit. As will be apparent to one of ordinary skill, various electrical receptacles found in electrical outlet may be configured so that as shown in FIGS. 20 and 21, a single GFIC is configured to protect one set of receptacles 42b which would not extend protection to the all the receptacles 42, 42a present at electrical outlet unit 1b. Although not shown, electrical outlet unit 1b may be configured so that all receptacles (42, 42a, 42b) are connected to and protected by the GFIC. As GFIs and GFIC's are well known to one of ordinary skill, additional discussion and circuit diagrams or drawings beyond those included herein and the preceding discussion are unnecessary to enable the present disclosure.

Electrical outlet unit 1b as disclosed herein could be used with any of the combinations of surge suppression, timer controlled charging and battery maintenance systems and configurations as disclosed and claimed herein, without limitation or restriction herein. One of ordinary skill will appreciate the GFI or GFIC enabled embodiments of the electrical outlet unit 1c, represented by FIGS. 20 and 21, and their supporting circuitry, may be configured in a multitude of ways as discussed further herein and may incorporate the circuitry and operation of FIGS. 8A, 8B, 9, 10, 11A, 11B, 12, 13 and 14 without limitation or restriction.

Having described several illustrative embodiments, other features of the present invention will undoubtedly occur to those versed in the art, as will numerous modifications and alterations in the embodiments of the invention illustrated, including other combinations of circuits and components to limit the amount of time a device having a rechargeable battery may draw electric current, all of which may be achieved without departing from the spirit and scope of the invention.

The invention claimed is:

1. An electrical outlet unit comprising:
  a. a housing;
  b. a main electrical inlet for receiving electricity from an external alternating current power source;
    i. a plurality of electrical outlets for discharging electricity wherein said main electrical inlet and said plurality of electrical outlets are mounted to said housing and are electrically connected by a plurality of cooperating circuits further comprising:
      a surge protection circuit, wherein said surge protection circuit is connected to said alternating current power source;
      a power supply circuit, wherein said surge protection circuit diverts current having a voltage potential above a predetermined value away from said power supply circuit;

a RC timer circuit, wherein said RC timer circuit is electrically connected to said power supply circuit;

a relay circuit, wherein said RC timer circuit is electrically connected to said power supply circuit and wherein at least one relay contact opens to isolate said electrical power source from said plurality of electrical outlets or said at least one relay contact closes to allow electrical power to flow from said electrical power source to said plurality of electrical outlets; and, ii. wherein said RC timer circuit controls the duration current is allowed to flow from said power supply circuit to said relay circuit to said plurality of said electrical outlets; and, iii. wherein a user may set the RC control circuit in discrete increments of time to control the duration of operation of said electrical outlet unit;

c. an appliance, wherein said housing is configured as a docking bay for integration with said appliance and said appliance is connected to said main electrical inlet to power said appliance.

2. The electrical outlet unit according to claim 1 wherein said housing is a plastic enclosure and a cord is electrically connected at a first end to said main electrical inlet and said cord second end is a standard grounded duplex 110-125 volt male prong.

3. The electrical outlet unit according to claim 1 wherein a status LED is electrically connected to said surge suppression circuit to indicate proper function.

4. The electrical outlet unit according to claim 1 wherein an initiation switch is electrically connected between said power supply circuit and said RC timer circuit, and said power supply resistor limits current flow to said RC timer capacitor.

5. The electrical outlet unit according to claim 1 wherein a user may set the duration of the periods when the RC control circuit does not operate to the control the duration between periods of operation of said electrical outlet unit.

6. An electrical outlet unit comprising:
a. a housing integrated into an appliance;
b. a main electrical inlet for receiving electricity from an external alternating current power source wherein said appliance is connected to and may receive electricity from said external alternating current power source;
c. a plurality of electrical outlets for discharging electricity wherein said main electrical inlet and said plurality of outlets are mounted within said housing and are electrically connected by a plurality of cooperating relay circuits further comprising:
 i. a power supply circuit, wherein said surge protection circuit diverts current having a voltage potential above a predetermined value away from said power supply circuit;
 ii. an initiation switch;
 iii. a control circuit to initiate a charging cycle wherein a user engages said initiation switch;
 iv. a microprocessor;
 v. a control circuit to change the length of the charging cycle wherein the input from the initiation switch activates said microprocessor to alter the length of a charging cycle;
 vi. a surge protection circuit to protect both the battery charger and the device being recharged;
 vii. a display that engages said control circuit to indicate unit status; and,
 viii. an automatic control circuit to terminate a charging cycle and control the duration current is allowed to flow from said power supply circuit to said relay circuit to said plurality of said alternating current power outlets.

7. The electrical outlet unit according to claim 6 having a plurality of receptacles adapted to allow a device charger to be connected.

8. The electrical outlet unit according to claim 6 wherein a status LED is electrically connected to said surge suppression circuit to indicate proper function.

9. An electrical outlet unit comprising:
a. a housing integrated into an appliance;
b. a main electrical inlet for receiving electricity from an external alternating current power source, wherein said appliance is connected to and may receive electricity from said external alternating current power source;
c. a plurality of electrical outlets for discharging electricity wherein said main electrical inlet and said plurality of outlets are mounted within said housing and are electrically connected by a plurality of cooperating relay circuits further comprising:
 i. a power supply circuit, wherein said surge protection circuit diverts current having a voltage potential above a predetermined value away from said power supply circuit;
 ii. an initiation switch;
 iii. a control circuit to initiate a charging cycle wherein a user engages said initiation switch;
 iv. a microprocessor;
 v. a control circuit to change the length of the charging cycle wherein the input from the initiation switch activates said microprocessor to alter the length of a charging cycle;
 vi. a control circuit wherein said microprocessor reinitiates a shortened charging cycle;
 vii. a surge protection circuit to protect both the battery charger and the device being recharged;
 viii. a display that engages said control circuit and said microprocessor to indicate unit status; and
 ix. an automatic control circuit to terminate a charging cycle and control the duration current is allowed to flow from said power supply circuit to said relay circuit to said plurality of said alternating current power outlets.

10. The electrical outlet unit according to claim 9 wherein said housing is a docking bay and a cord is electrically connected at a first end to said main electrical inlet and said cord second end is a standard grounded duplex 110-125 volt ac prong.

11. The electrical outlet unit according to claim 9 having a USB port located therein.

12. The electrical outlet unit according to claim 10 wherein a status LED is electrically connected to said surge suppression circuit to indicate proper function.

13. An electrical outlet unit comprising:
a. a housing;
b. a main electrical inlet for receiving electricity from an external alternating current power source;
c. a plurality of electrical outlets for discharging electricity wherein said main electrical inlet and said plurality of outlets are mounted within said housing and are electrically connected by a plurality of cooperating relay circuits further comprising:

i. a power supply circuit, wherein said surge protection circuit diverts current having a voltage potential above a predetermined value away from said power supply circuit;
ii. an initiation switch;
iii. a control circuit to initiate a charging cycle wherein a user engages said initiation switch;
iv. a microprocessor;
v. a control circuit to change the length of the charging cycle wherein the input from the initiation switch activates said microprocessor to alter the length of a charging cycle;
vi. a display that engages said control circuit to indicate unit status; and,
vii. an automatic control circuit to terminate a charging cycle and control the duration current is allowed to flow from said power supply circuit to said relay circuit to said plurality of said alternating current power outlets; and, d. wherein at least of one of said alternating current power outlets is electrically connected to a ground fault interrupter circuit further comprising:
i. at least one hot line;
ii. at least one neutral line;
iii. at least one sensing coil, wherein said at least one sensing coil is connected between said at least one hot line and said at least one neutral line forming a GFI circuit therein; and,
iv. at least one comparator circuit connected to said sensing coil and a trip coil wherein upon induction of a voltage across said sensing coil, said trip coil is actuated opening said GFI circuit formed between said at least one hot wire and said at least neutral line connected by said sensing coil to interrupt current flow to said alternating current power outlets connected therein.

14. The electrical outlet unit according to claim 13 having a plurality of receptacles adapted to allow a device charger to be connected therein.

15. The electrical outlet unit according to claim 13 wherein said relay circuits include a surge protection circuit to protect both the battery charger and the device being recharged.

16. The electrical outlet unit according to claim 13 wherein a status LED is electrically connected to said surge suppression circuit to indicate proper function.

17. The electrical outlet unit according to claim 13 wherein a user may set the duration of the periods when the control circuit does not operate to control the duration between periods of operation of said electrical outlet unit.

* * * * *